US012755395B2

(12) United States Patent
Li et al.

(10) Patent No.: US 12,755,395 B2
(45) Date of Patent: Oct. 6, 2026

(54) OBJECT TRACKING ACROSS A WIDE RANGE OF DISTANCES FOR DRIVING APPLICATIONS

(71) Applicant: Waymo LLC, Mountain View, CA (US)

(72) Inventors: Qinru Li, Redmond, WA (US); Longlong Jing, Mountain View, CA (US); Ruichi Yu, Mountain View, CA (US); Xu Chen, Livermore, CA (US); Shiwei Sheng, Burlingame, CA (US)

(73) Assignee: Waymo LLC

( * ) Notice: Subject to any disclaimer, the term of this patent is extended or adjusted under 35 U.S.C. 154(b) by 418 days.

(21) Appl. No.: 18/221,577

(22) Filed: Jul. 13, 2023

(65) Prior Publication Data

US 2025/0022143 A1 Jan. 16, 2025

(51) Int. Cl.

| | |
|---|---|
| ***G06T 7/20*** | (2017.01) |
| ***G01S 17/89*** | (2020.01) |
| ***G05D 1/00*** | (2006.01) |
| ***G06V 10/25*** | (2022.01) |
| ***G06V 10/44*** | (2022.01) |
| ***G06V 20/56*** | (2022.01) |

(52) U.S. Cl.

CPC ................ *G06T 7/20* (2013.01); *G01S 17/89* (2013.01); *G05D 1/021* (2013.01); *G06V 10/25* (2022.01); *G06V 10/44* (2022.01); *G06V 20/56* (2022.01); *G06T 2207/20084* (2013.01); *G06T 2207/20132* (2013.01); *G06V 2201/07* (2022.01)

(58) Field of Classification Search

None

See application file for complete search history.

(56) References Cited

U.S. PATENT DOCUMENTS

| | | | | |
|---|---|---|---|---|
| 11,906,660 | B2 * | 2/2024 | Wekel | G06F 18/25 |
| 12,154,296 | B2 * | 11/2024 | Sivakumar | G06T 7/80 |
| 2020/0174490 | A1 * | 6/2020 | Ogale | G05D 1/0221 |
| 2021/0181758 | A1 * | 6/2021 | Das | G06F 18/25 |
| 2021/0192231 | A1 * | 6/2021 | Lee | G05D 1/0231 |
| 2022/0269937 | A1 * | 8/2022 | Kim | G06F 30/27 |
| 2022/0292289 | A1 * | 9/2022 | Shalumov | G06T 3/4038 |
| 2022/0301207 | A1 * | 9/2022 | Guizilini | G06T 7/55 |

(Continued)

OTHER PUBLICATIONS

Wang et al. "DeepFusionMOT: A 3D Multi-Object Tracking Framework Based on Camera-LiDAR Fusion with Deep Association", IEEE Robotics and Automation Letters. Preprint Version. Accepted Jun. 2022 (Year: 2022).*

*Primary Examiner* — Randolph I Chu

(74) *Attorney, Agent, or Firm* — Van Hoven PC; Jordan Becker

(57) ABSTRACT

The described aspects and implementations enable efficient and seamless tracking of objects in vehicle environments using different sensing modalities across a wide range of distances. A perception system of a vehicle deploys an object tracking pipeline with a plurality of models that include a camera model trained to perform, using camera images, object tracking at distances exceeding a lidar sensing range, a lidar model trained to perform, using lidar images, object tracking at distances within the lidar sensing range, and a camera-lidar model trained to transfer, using the camera images and the lidar images, object tracking from the camera model to the lidar model.

20 Claims, 9 Drawing Sheets

(56) References Cited

U.S. PATENT DOCUMENTS

| | | | | |
|---|---|---|---|---|
| 2022/0358328 | A1* | 11/2022 | Wu | G06N 3/045 |
| 2023/0005169 | A1* | 1/2023 | Deegan | G06T 7/10 |
| 2023/0115660 | A1* | 4/2023 | Sivakumar | G06V 10/74 348/187 |
| 2024/0371132 | A1* | 11/2024 | Uziel | G06V 10/761 |
| 2025/0022143 | A1* | 1/2025 | Li | G05D 1/021 |

* cited by examiner

OBJECT TRACKING ACROSS A WIDE RANGE OF DISTANCES FOR DRIVING APPLICATIONS

TECHNICAL FIELD

The instant specification generally relates to autonomous vehicles. More specifically, the instant specification relates to efficient automated detection, identification, and tracking of objects for driver assistance systems and autonomous vehicles.

BACKGROUND

An autonomous (fully and partially self-driving) vehicle (AV) operates by sensing an outside environment with various electromagnetic (e.g., radar and optical) and non-electromagnetic (e.g., audio and humidity) sensors. Some autonomous vehicles chart a driving path through the environment based on the sensed data. The driving path can be determined based on Global Positioning System (GPS) data and road map data. While the GPS and the road map data can provide information about static aspects of the environment (buildings, street layouts, road closures, etc.), dynamic information (such as information about other vehicles, pedestrians, street lights, etc.) is obtained from contemporaneously collected sensing data. Precision and safety of the driving path and of the speed regime selected by the autonomous vehicle depend on timely and accurate identification of various objects present in the outside environment and on the ability of a driving algorithm to process the information about the environment and to provide correct instructions to the vehicle controls and the drivetrain.

BRIEF DESCRIPTION OF THE DRAWINGS

The present disclosure is illustrated by way of examples, and not by way of limitation, and can be more fully understood with references to the following detailed description when considered in connection with the figures, in which.

SUMMARY

Figure 1:
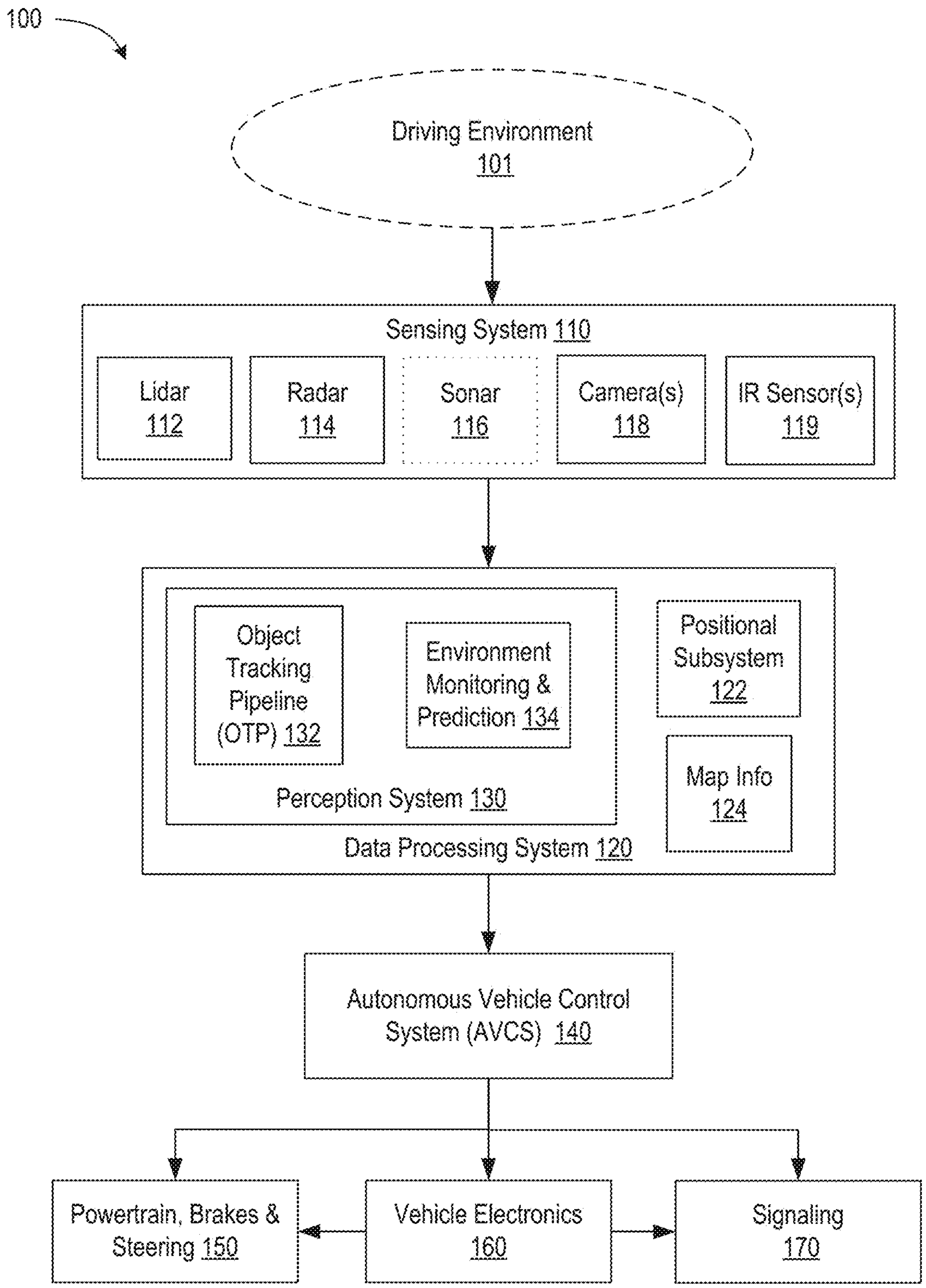
FIG. 1 is a diagram illustrating components of an example autonomous vehicle (AV) capable of pipelined detection and tracking of objects located within a wide range of distances from the AV, in accordance with some implementations of the present disclosure.

In one implementation, disclosed is a system that includes a sensing system of a vehicle, the sensing system configured to acquire one or more camera images of an outside environment at a first time, and one or more lidar images of the outside environment at a second time. The system further includes a processing system of the vehicle, the processing system configured to provide the one or more camera images and positional data from a plurality of object tracks as input to a first set of one or more neural networks (NNs), each of the plurality of object tracks comprising positional data for a respective object of a plurality of objects in the outside environment. The processing system is further to update the plurality of object tracks based on an output of the first set of one or more NNs. The processing system is further to provide the one or more lidar images, the one or more camera images, and the positional data from the plurality of object tracks as input to a second set of one or more NNs. The processing system is to further update the plurality of object tracks based on an output of the second set of one or more NNs and cause a driving path of a vehicle to be modified in view of the plurality of object tracks.

In another implementation, disclosed is a system that includes a sensing system of a vehicle, the sensing system configured to obtain camera images of an environment of the vehicle, and obtain lidar images of the environment of the vehicle. The system further includes a perception system of the vehicle having an object tracking pipeline having a plurality of machine learning models (MLMs), wherein the plurality of MLMs includes a camera MLM trained to perform, using the camera images, an object tracking of an object located at distances exceeding a lidar sensing range, a lidar MLM trained to perform, using the lidar images, the object tracking of the object moved to distances within the lidar sensing range, and a camera-lidar MLM trained to transfer, using the camera images and the lidar images, object tracking from the camera MLM to the lidar MLM.

In another implementation, disclosed is a method that includes providing, by a processing device, one or more camera images of an outside environment acquired at a first time, and positional data from a plurality of object tracks as input to a first set of one or more neural networks (NNs), each of the plurality of object tracks comprising positional data for a respective object of a plurality of objects in the outside environment. The method further includes updating, by the processing device, the plurality of object tracks based on an output of the first set of one or more NNs. The method further includes providing, by the processing device, one or more lidar images of the outside environment acquired at a second time, the one or more camera images of the outside environment acquired at the first time, and the positional data from the plurality of object tracks as input to a second set of one or more NNs. The method further includes further updating the plurality of object tracks based on an output of the second set of one or more NNs and causing, by the processing device, a driving path of a vehicle to be modified in view of the plurality of object tracks.

DETAILED DESCRIPTION

An autonomous vehicle or a vehicle deploying various driving assistance features can use multiple sensor modalities to facilitate detection of objects in the outside environment and determine a trajectory of motion of such objects. Such sensors can include radio detection and ranging (radar) sensors, light detection and ranging (lidar) sensors, multiple digital cameras, sonars, positional sensors, and the like. Different types of sensors can provide different and complementary benefits. For example, radars and lidars emit electromagnetic signals (radio signals or optical signals) that reflect from the objects and carry back information about distances to the objects (e.g., from the time of flight of the signals) and velocities of the objects (e.g., from the Doppler shift of the frequencies of the reflected signals). Radars and lidars can scan an entire 360-degree view by using a series of consecutive sensing frames. Sensing frames can include numerous reflections covering the outside environment in a dense grid of return points. Each return point can be associated with the distance to the corresponding reflecting object and a radial velocity (a component of the velocity along the line of sight) of the reflecting object.

Lidars, by virtue of their sub-micron optical wavelengths, have high spatial resolution, which allows obtaining many closely-spaced return points from the same object. This enables accurate detection and tracking of objects once the objects are within the reach of lidar sensors. Lidars, however, have a limited operating range and do not capture objects located at large distances, e.g., distances beyond 150-350 m, depending on a specific lidar model, with higher ranges typically achieved by more powerful and expensive systems. Under adverse weather conditions (e.g., rain, fog, mist, dust, etc.), lidar operating distances can be shortened even more.

Radar sensors are inexpensive, require less maintenance than lidar sensors, have a large working range of distances, and have a good tolerance of adverse weather conditions. But as a result of much longer (radio) wavelengths used by radars, resolution of radar data is much lower than that of lidars. In particular, while radars are capable of accurate determination of velocities of objects moving with not too small velocities (relative to the radar receiver), detecting accurate locations of objects can be often problematic.

Cameras (e.g., photographic or video cameras) can acquire high resolution images at both shorter distances (where lidars operate) and longer distances (where lidars do not reach). Cameras, however, only capture two-dimensional projections of the three-dimensional outside space onto an image plane (or some other non-planar imaging surface). As a result, positioning of objects detected in camera images can have a much higher error along the radial direction compared with the lateral localization of objects. Correspondingly, while accurate detection and tracking of objects within shorter ranges is best performed using lidars, cameras remain the sensors of choice beyond such ranges. Accordingly, a typical object approaching a vehicle can be first detected based on long-distance camera images. As additional images are collected, changing object location can be further determined from those additional images and an object track can be created by the vehicle's perception system. An object track refers to a representation of a position of an object, orientation of the object, state of motion of the object (e.g., for multiple times) and can include any information that can be extracted from the images. For example, an object track can include radial and lateral coordinates of an object, velocity of the object, type and/or size of the object, and/or the like. Some of the data, e.g., radial velocity speed and distance to the object can be collected by radar sensors.

As the object approaches and enters the lidar range, the object track can be transferred to the lidar sensing modality where further tracking of the object can be performed using the more accurate lidar data. However, because of a very different format of lidar data, consistent and seamless transfer of camera tracks to the lidar sensing modality can be challenging. For example, when multiple objects are present in a field of view, inaccuracies in a track transfer process can result in a mismatch between the camera tracks and lidar tracks. As a result of misidentification of objects during transfer (and hence various tracking histories being associated with incorrect objects), the perception system can be temporarily confused. This results in reduced time available for decision-making and changing the vehicle's trajectory (by steering/braking/accelerating/etc.), which may be especially disadvantageous in situations where a vehicle has a large stopping and/or steering distance (e.g., a loaded truck) and/or where track transfers occur at short distances, e.g., when the lidar sensing range is reduced by adverse weather conditions.

Aspects and implementations of the present disclosure address these and other challenges of the existing object identification and tracking technology by enabling methods and systems that efficiently and seamlessly match and transfer object tracks through a transition region between different sensing modalities, e.g., from camera sensing to lidar sensing. In some implementations, an object tracking pipeline deploys multiple machine learning models (MLMs) responsible for processing of the data collected at different distance ranges. For example, at large distances (e.g., beyond range of lidar sensors $L_{max}$) $L>L_{max}$, a trained camera MLM can process various data to initiate and, subsequently, update an object track that is referred to herein as a camera track of an object. Inputs into camera MLM can include one or more of the following: cropped camera images with the most recent depiction of the object, one or more previous camera images of the object, a geo-motion (positional) history of the object (e.g., a time sequence of coordinates/speed/acceleration of the object) and/or the like. The camera MLM can process this input data for various existing (or newly established tracks) and output probabilities of different tracks being associated with various objects. An object tracking module can then perform object-to-track assignment based on the output probabilities. The tracks can then be updated with the data collected from the most recent images.

As some of the objects approach the sensing system and enter the range $L<L_{max}$ where reliable (e.g., with a signal-to-noise ratio above a certain empirically-determined threshold) lidar data is available, the data collected for those objects—both the camera data and the lidar data—can be used as an input into a second, camera-lidar (transfer), model. The camera-lidar model is capable of processing multi-modal inputs, with previously collected camera images and newly collected lidar images (e.g., cropped portions of the lidar point cloud) used for object tracking. The camera-lidar model can output object-to-track probabilities (e.g., similar to the camera model), which can be used by the object tracking module for object-to-track assignment.

In some implementations, the camera-lidar model can be used to process a low number of sensing frames (as low as a single sensing frame, in some instances), sufficient to connect newly established lidar tracks to the existing camera tracks and associate various collected geo-motion data with the newly established lidar tracks. From that point of connection, sensing can be handed over to a third model—a lidar model. The lidar model can operate similarly to the camera model and camera-lidar model, but using both new lidar images and previously collected lidar images and, in some implementations, without assistance from camera images. Some aspects of the pipelined handling of object tracks is illustrated (at a high level) in FIG. 2.

The advantages of the disclosed techniques and systems include, but are not limited to, consistent and fast conversion of camera tracks to lidar tracks, in which the downstream models of the pipeline inherit correct track information from the upstream models. Although for brevity and conciseness, various systems and methods can be described in conjunction with objects that approach the vehicle (and whose accurate detection and tracking is most important), similar techniques can be used in the opposite direction—for tracking of objects that are moving away from the vehicle. In such instances, the object tracking pipeline can be deployed in the reverse direction, e.g., starting from the lidar camera model and ending with the camera model.

In those instances, where description of implementations refers to autonomous vehicles, it should be understood that similar techniques can be used in various driver assistance systems that do not rise to the level of fully autonomous driving systems. More specifically, disclosed techniques can be used in Level 2 driver assistance systems that implement steering, braking, acceleration, lane centering, adaptive cruise control, etc., as well as other driver support. Likewise, the disclosed techniques can be used in Level 3 driving assistance systems capable of autonomous driving under limited (e.g., highway) conditions. In such systems, fast and accurate detection and tracking of objects can be used to inform the driver of the approaching vehicles and/or other objects, with the driver making the ultimate driving decisions (e.g., in Level 2 systems), or to make certain driving decisions (e.g., in Level 3 systems), such as reducing speed, changing lanes, etc., without requesting driver's feedback.

FIG. 1 is a diagram illustrating components of an example autonomous vehicle (AV) 100 capable of pipelined detection and tracking of objects located within a wide range of distances from the AV, in accordance with some implementations of the present disclosure. Autonomous vehicles can include motor vehicles (cars, trucks, buses, motorcycles, all-terrain vehicles, recreational vehicles, any specialized farming or construction vehicles, and the like), aircraft (planes, helicopters, drones, and the like), naval vehicles (ships, boats, yachts, submarines, and the like), or any other self-propelled vehicles (e.g., robots, factory or warehouse robotic vehicles, sidewalk delivery robotic vehicles, etc.) capable of being operated in a self-driving mode (without a human input or with a reduced human input).

A driving environment 101 can include any objects (animated or non-animated) located outside the AV, such as roadways, buildings, trees, bushes, sidewalks, bridges, mountains, other vehicles, pedestrians, and so on. The driving environment 101 can be urban, suburban, rural, and so on. In some implementations, the driving environment 101 can be an off-road environment (e.g., farming or other agricultural land). In some implementations, the driving environment can be an indoor environment, e.g., the environment of an industrial plant, a shipping warehouse, a hazardous area of a building, and so on. In some implementations, the driving environment 101 can be substantially flat, with various objects moving parallel to a surface (e.g., parallel to the surface of Earth). In other implementations, the driving environment can be three-dimensional and can include objects that are capable of moving along all three directions (e.g., balloons, leaves, etc.). Hereinafter, the term "driving environment" should be understood to include all environments in which an autonomous motion of self-propelled vehicles can occur. For example, "driving environment" can include any possible flying environment of an aircraft or a marine environment of a naval vessel. The objects of the driving environment 101 can be located at any distance from the AV, from close distances of several feet (or less) to several miles (or more).

As described herein, in a semi-autonomous or partially autonomous driving mode, even though the vehicle assists with one or more driving operations (e.g., steering, braking and/or accelerating to perform lane centering, adaptive cruise control, advanced driver assistance systems (ADAS), or emergency braking), the human driver is expected to be situationally aware of the vehicle's surroundings and supervise the assisted driving operations. Here, even though the vehicle may perform all driving tasks in certain situations, the human driver is expected to be responsible for taking control as needed.

Although, for brevity and conciseness, various systems and methods may be described below in conjunction with autonomous vehicles, similar techniques can be used in various driver assistance systems that do not rise to the level of fully autonomous driving systems. In the United States, the Society of Automotive Engineers (SAE) have defined different levels of automated driving operations to indicate how much, or how little, a vehicle controls the driving, although different organizations, in the United States or in other countries, may categorize the levels differently. More specifically, disclosed systems and methods can be used in SAE Level 2 (L2) driver assistance systems that implement steering, braking, acceleration, lane centering, adaptive cruise control, etc., as well as other driver support. The disclosed systems and methods can be used in SAE Level 3 (L3) driving assistance systems capable of autonomous driving under limited (e.g., highway) conditions. Likewise, the disclosed systems and methods can be used in vehicles that use SAE Level 4 (L4) self-driving systems that operate autonomously under most regular driving situations and require only occasional attention of the human operator. In all such driving assistance systems, accurate lane estimation can be performed automatically without a driver input or control (e.g., while the vehicle is in motion) and result in improved reliability of vehicle positioning and navigation and the overall safety of autonomous, semi-autonomous, and other driver assistance systems. As previously noted, in addition to the way in which SAE categorizes levels of automated driving operations, other organizations, in the United States or in other countries, may categorize levels of automated driving operations differently. Without limitation, the disclosed systems and methods herein can be used in driving assistance systems defined by these other organizations' levels of automated driving operations.

The example AV 100 can include a sensing system 110. The sensing system 110 can include various electromagnetic (e.g., optical) and non-electromagnetic (e.g., acoustic) sensing subsystems and/or devices. The sensing system 110 can include a radar 114 (or multiple radars 114), which can be any system that utilizes radio or microwave frequency signals to sense objects within the driving environment 101 of the AV 100. The radar(s) 114 can be configured to sense both the spatial locations of the objects (including their spatial dimensions) and velocities of the objects (e.g., using the Doppler shift technology). Hereinafter, "velocity" refers to both how fast the object is moving (the speed of the object) as well as the direction of the object's motion. The sensing system 110 can include a lidar 112, which can be a laser-based unit capable of determining distances to the objects and velocities of the objects in the driving environment 101. Each of the lidar 112 and radar 114 can include a coherent sensor, such as a frequency-modulated continuous-wave (FMCW) lidar or radar sensor. For example, radar 114 can use heterodyne detection for velocity determination. In some implementations, the functionality of a ToF and coherent radar is combined into a radar unit capable of simultaneously determining both the distance to and the radial velocity of the reflecting object. Such a unit can be configured to operate in an incoherent sensing mode (ToF mode) and/or a coherent sensing mode (e.g., a mode that uses heterodyne detection) or both modes at the same time. In some implementations, multiple lidars 112 or radars 114 can be mounted on AV 100.

Lidar 112 can include one or more light sources producing and emitting signals and one or more detectors of the signals reflected back from the objects. In some implementations, lidar 112 can perform a 360-degree scanning in a horizontal direction. In some implementations, lidar 112 can be capable of spatial scanning along both the horizontal and vertical directions. In some implementations, the field of view can be up to 90 degrees in the vertical direction (e.g., with at least a part of the region above the horizon being scanned with radar signals). In some implementations, the field of view can be a full sphere (consisting of two hemispheres).

The sensing system 110 can further include one or more cameras 118 to capture images of the driving environment 101. The images can be two-dimensional projections of the driving environment 101 (or parts of the driving environment 101) onto a projecting surface (flat or non-flat) of the camera(s). Some of the cameras 118 of the sensing system 110 can be video cameras configured to capture a continuous (or quasi-continuous) stream of images of the driving environment 101. The sensing system 110 can also include one or more infrared (IR) sensors 119. The sensing system 110 can further include one or more sonars 116, which can be ultrasonic sonars, in some implementations.

The sensing data obtained by the sensing system 110 can be processed by a data processing system 120 of AV 100. For example, the data processing system 120 can include a perception system 130. The perception system 130 can be configured to detect and track objects in the driving environment 101 and to recognize the detected objects. For example, the perception system 130 can analyze images captured by the cameras 118 and can be capable of detecting traffic light signals, road signs, roadway layouts (e.g., boundaries of traffic lanes, topologies of intersections, designations of parking places, and so on), presence of obstacles, and the like. The perception system 130 can further receive radar sensing data (Doppler data and ToF data) to determine distances to various objects in the environment 101 and velocities (radial and, in some implementations, transverse, as described below) of such objects. In some implementations, the perception system 130 can use radar data in combination with the data captured by the camera(s) 118, as described in more detail below.

The perception system 130 can include an object tracking pipeline (OTP) 132 to facilitate detection and tracking of objects from large distances from the AV to the objects, where camera (or radar) detection is being used, to significantly smaller distances, where tracking is performed based on lidar sensing (or in the opposite direction). OTP 132 can include multiple MLMs, e.g., a camera model, a camera-lidar model, a lidar model, and/or the like, each model operating under specific conditions and processing different inputs, as described in more detail below.

Figure 2:
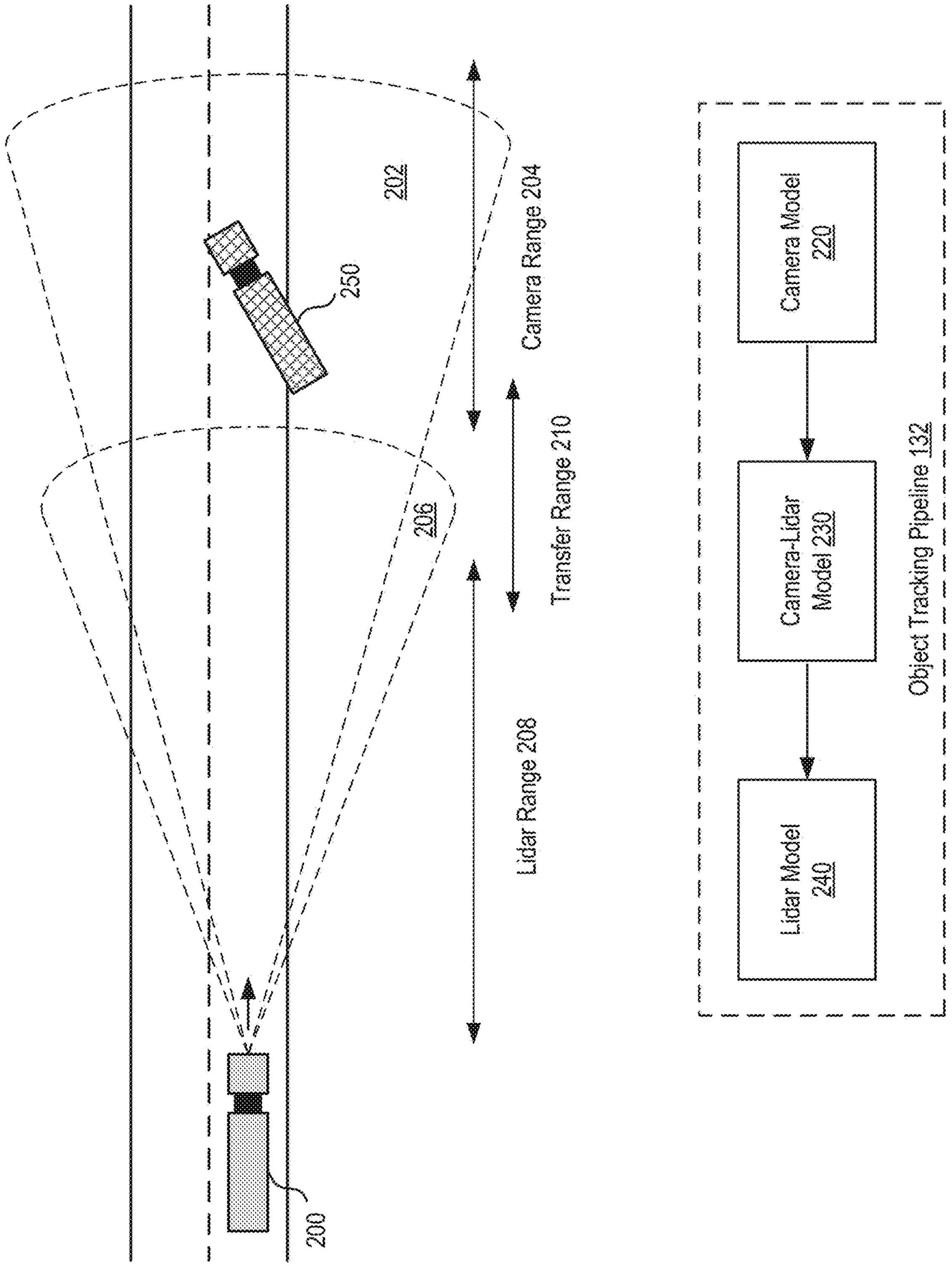
FIG. 2 illustrates schematically a high-level architecture and deployment of an example object tracking pipeline operating in accordance with some implementations of the present disclosure.

FIG. 2 illustrates schematically a high-level architecture and deployment of an example object tracking pipeline operating in accordance with some implementations of the present disclosure. A vehicle 200 can be any autonomous vehicle (e.g., car, truck, bus, tram, etc.) or a vehicle deploying a driver assistance technology. Vehicle 200 can deploy sensors of multiple modalities, including but not limited to cameras, lidars, radars, etc. As shown in FIG. 2, one or more camera sensors can have a camera view 202 that extends to large distances (e.g., more than several hundred meters, one or several kilometers, and/or the like), the range of distances referred to as a camera range 204 herein. Similarly, one or more lidar sensors can have a lidar view 206 that extends to smaller distances (e.g., up to several hundred meters, and/or the like), the range of distances referred to as a lidar range 208 herein. A transfer range 210 can be located at the top of the lidar range 208. Objects located within the camera range 204 can be tracked using a camera model 220, objects that has entered the transfer range 210 can be tracked using a camera-lidar model 230, and objects that are inside the lidar range 208 can be tracked using lidar model 240, e.g., as soon as the camera-lidar model 230 has connected camera track (s) with lidar data.

More specifically, as vehicle 200 is moving, its camera(s) can detect a presence of an obstacle 250 in a driving environment, e.g., a stopped and/or disabled vehicle, or some other object that is stationary (as in the instant example) or moving. As obstacle 250 is moving relative to vehicle 200, the distance between vehicle 200 and obstacle 250 is decreasing with time. Initial discovery of obstacle 250 can be performed using camera model 220. As the distance between vehicle 200 and obstacle 250 decreases and enters transfer range 210, the transfer of tracking of obstacle 250 from camera model 220 to camera-lidar model 230 begins. As the distance between vehicle 200 and obstacle 250 decreases even further and tracking is reliably transferred from camera tracking to lidar tracking, the use of camera-lidar model 230 is replaced with the use of lidar model 240.

Referring again to FIG. 1, OTP 132 performs detection and tracking of objects (as well as, in some cases, object type identification/classification) as part of operations performed by perception system 130. Perception system 130 can further receive information from a positioning subsystem, which can include a GPS transceiver and/or inertial measurement unit (IMU) (not shown in FIG. 1), configured to obtain information about the position of the AV relative to Earth and its surroundings. The positioning subsystem 122 can use the positioning data, e.g., GPS and IMU data) in conjunction with the sensing data to help accurately determine the location of the AV with respect to fixed objects of the driving environment 101 (e.g., roadways, lane boundaries, intersections, sidewalks, crosswalks, road signs, curbs, surrounding buildings, etc.) whose locations can be provided by map information 124. In some implementations, the data processing system 120 can receive non-electromagnetic data, such as audio data (e.g., ultrasonic sensor data, or data from a mic picking up emergency vehicle sirens), temperature sensor data, humidity sensor data, pressure sensor data, meteorological data (e.g., wind speed and direction, precipitation data), and the like.

The perception system 130 can further include an environment monitoring and prediction component 134, which can monitor how the driving environment 101 evolves with time, e.g., by keeping track of the locations and velocities of the animate objects (e.g., relative to Earth). In some implementations, the environment monitoring and prediction component 134 can keep track of the changing appearance of the environment due to a motion of the AV relative to the environment. In some implementations, the environment monitoring and prediction component 134 can make predictions about how various tracked objects of the driving environment 101 will be positioned within a prediction time horizon. The predictions can be based on the current locations and velocities of the tracked objects as well as on the earlier locations and velocities (and, in some cases, accelerations) of the tracked objects. For example, based on stored data (referred as "track" herein) for object 1 (e.g., a stationary relative to the ground obstacle 250 in FIG. 2, a slow-moving vehicle) indicating location/velocity of object 1 during the previous 3-second period, the environment monitoring and prediction component 134 can conclude that object 1 is maintaining a constant speed. Accordingly, the environment monitoring and prediction component 134 can predict where object 1 is likely to be within the next 3 or 5 seconds of motion. As another example, based on track for object 2 indicating decelerated motion of object 2 approaching a road intersection over the previous 2-second period, the environment monitoring and prediction component 134 can conclude that object 2 is about to come to a stop sign before making a turn to a side road. Accordingly, the environment monitoring and prediction component 134 can predict where object 2 is likely to be within the next 1 or 3 seconds. The environment monitoring and prediction component 134 can perform periodic checks of the accuracy of its predictions and modify the predictions based on new data obtained from the sensing system 110. The environment monitoring and prediction component 134 can operate in conjunction with OTP 132. In some implementations, OTP 132 can be integrated into the environment monitoring and prediction component 134.

The data generated by the perception system 130, the positional subsystem 122, and the environment monitoring and prediction component 134 can be used by an autonomous driving system, such as AV control system (AVCS) 140. The AVCS 140 can include one or more algorithms that control how AV is to behave in various driving situations and environments. For example, the AVCS 140 can include a navigation system for determining a global driving route to a destination point. The AVCS 140 can also include a driving path selection system for selecting a particular path through the immediate driving environment, which can include selecting a traffic lane, negotiating a traffic congestion, choosing a place to make a U-turn, selecting a trajectory for a parking maneuver, and so on. The AVCS 140 can also include an obstacle avoidance system for safe avoidance of various obstructions (rocks, stalled vehicles, a jaywalking pedestrian, and so on) within the driving environment of the AV. The obstacle avoidance system can be configured to evaluate the size of the obstacles and the trajectories of the obstacles (if obstacles are animated) and select an optimal driving strategy (e.g., braking, steering, accelerating, etc.) for avoiding the obstacles.

Algorithms and modules of AVCS 140 can generate instructions for various systems and components of the vehicle, such as the powertrain, brakes, and steering 150, vehicle electronics 160, signaling 170, and other systems and components not explicitly shown in FIG. 1. The powertrain, brakes, and steering 150 can include an engine (internal combustion engine, electric engine, and so on), transmission, differentials, axles, wheels, steering mechanism, and other systems. The vehicle electronics 160 can include an on-board computer, engine management, ignition, communication systems, carputers, telematics, in-car entertainment systems, and other systems and components. The signaling 170 can include high and low headlights, stopping lights, turning and backing lights, horns and alarms, inside lighting system, dashboard notification system, passenger notification system, radio and wireless network transmission systems, and so on. Some of the instructions output by the AVCS 140 can be delivered directly to the powertrain, brakes, and steering 150 (or signaling 170) whereas other instructions output by the AVCS 140 are first delivered to the vehicle electronics 160, which generates commands to the powertrain, brakes, and steering 150 and/or signaling 170.

In one example, the AVCS 140 can determine that an obstacle identified by the data processing system 120 is to be avoided by decelerating the vehicle until a safe speed is reached, followed by steering the vehicle around the obstacle. The AVCS 140 can output instructions to the powertrain, brakes, and steering 150 (directly or via the vehicle electronics 160) to: (1) reduce, by modifying the throttle settings, a flow of fuel to the engine to decrease the engine rpm; (2) downshift, via an automatic transmission, the drivetrain into a lower gear; (3) engage a brake unit to reduce (while acting in concert with the engine and the transmission) the vehicle's speed until a safe speed is reached; and (4) perform, using a power steering mechanism, a steering maneuver until the obstacle is safely bypassed. Subsequently, the AVCS 140 can output instructions to the powertrain, brakes, and steering 150 to resume the previous speed settings of the vehicle.

The "autonomous vehicle" can include motor vehicles (cars, trucks, buses, motorcycles, all-terrain vehicles, recreational vehicle, any specialized farming or construction vehicles, and the like), aircrafts (planes, helicopters, drones, and the like), naval vehicles (ships, boats, yachts, submarines, and the like), robotic vehicles (e.g., factory, warehouse, sidewalk delivery robots, etc.) or any other self-propelled vehicles capable of being operated in a self-driving mode (without a human input or with a reduced human input). "Objects" can include any entity, item, device, body, or article (animate or inanimate) located outside the autonomous vehicle, such as roadways, buildings, trees, bushes, sidewalks, bridges, mountains, other vehicles, piers, banks, landing strips, animals, birds, or other things.

Figure 3:
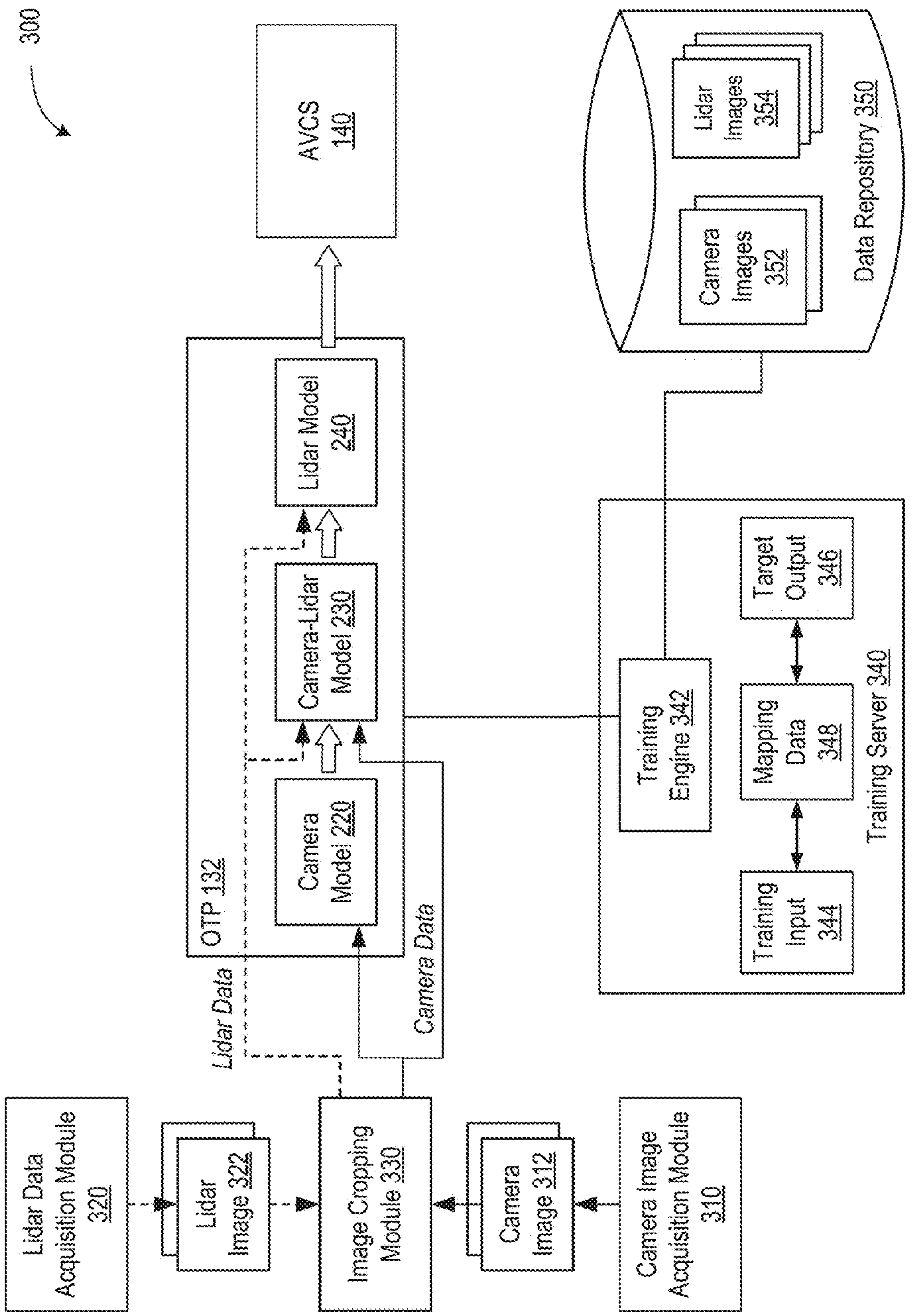
FIG. 3 is a diagram illustrating an example architecture of a part of a vehicle's perception system capable of pipelined detection and tracking of objects in driving environments, in accordance with some implementations of the present disclosure.

FIG. 3 is a diagram illustrating an example architecture 300 of a part of a vehicle's perception system capable of pipelined detection and tracking of objects in driving environments, in accordance with some implementations of the present disclosure. An input into the perception system (e.g., perception system 130 of FIG. 1) can include data obtained by sensing system 110 (e.g., by lidar 112 and camera(s) 118). The obtained data can be provided to the perception system by a camera image acquisition module 310 and by a lidar data acquisition module 320. More specifically, camera image acquisition module 310 can acquire a sequence of camera images 312. Each camera image 312 can have pixels of various intensities of one color (for black-and-white images) or multiple colors (for color images). Camera images 312 can be panoramic images or images depicting a specific portion of the driving environment.

A lidar image acquisition module 320 can provide lidar data, e.g., lidar images 322, which can include a set of return points (point cloud) corresponding to laser beam reflection from various objects in the driving environment. Each return point can be understood as a data unit (pixel) that includes coordinates of reflecting surfaces, radial velocity data, intensity data, and/or the like. For example, lidar image acquisition module 320 can provide lidar images 322 that includes the lidar intensity map I(R, θ, ϕ), where R, θ, ϕ is a set of spherical coordinates. In some implementations, Cartesian coordinates, elliptic coordinates, parabolic coordinates, or any other suitable coordinates can be used instead. The lidar intensity map identifies an intensity of the lidar reflections for various points in the field of view of the lidar. The coordinates of objects (or surfaces of the objects) that reflect lidar signals can be determined from directional data (e.g., polar θ and azimuthal ϕ angles in the direction of lidar transmissions) and distance data (e.g., radial distance R determined from the time of flight of lidar signals). The lidar data can further include velocity data of various reflecting objects identified based on detected Doppler shift of the reflected signals.

Camera images 312 and/or lidar images 322 can be large images of the entire (visible) driving environment or images of a significant portion of the driving environment (e.g., camera image acquired by a forward-facing camera(s) of the vehicle's sensing system). Image cropping module 330 can crop camera/lidar images into portions (also referred to as patches herein) of images associated with individual objects. For example, camera images 312 can include a number of pixels. The number of pixels can depend on the resolution of the image. Each pixel can be characterized by one or more intensity values. A black-and-white pixel can be characterized by one intensity value, e.g., representing the brightness of the pixel, with value 1 corresponding to a white pixel and value 0 corresponding to a black pixel (or vice versa). The intensity value can assume continuous (or discretized) values between 0 and 1 (or between any other chosen limits, e.g., 0 and 255). Similarly, a color pixel can be represented by more than one intensity value, such as three intensity values (e.g., if the RGB color encoding scheme is used) or four intensity values (e.g., if the CMYK color encoding scheme is used). Camera images 312 can be preprocessed, e.g., downscaled (with multiple pixel intensity values combined into a single pixel value), upsampled, filtered, denoised, and the like. Camera image(s) 312 can be in any suitable digital format (JPEG, TIFF, GIG, BMP, CGM, SVG, and so on).

Image cropping module 330 can identify one or more locations in a camera image 312 and/or lidar image 322 that are associated with an object. For example, image cropping module 330 can include an object identification MLM (not depicted in FIG. 3) trained to identify regions that include objects of interest, e.g., vehicles, pedestrians, animals, etc.

Figure 4:
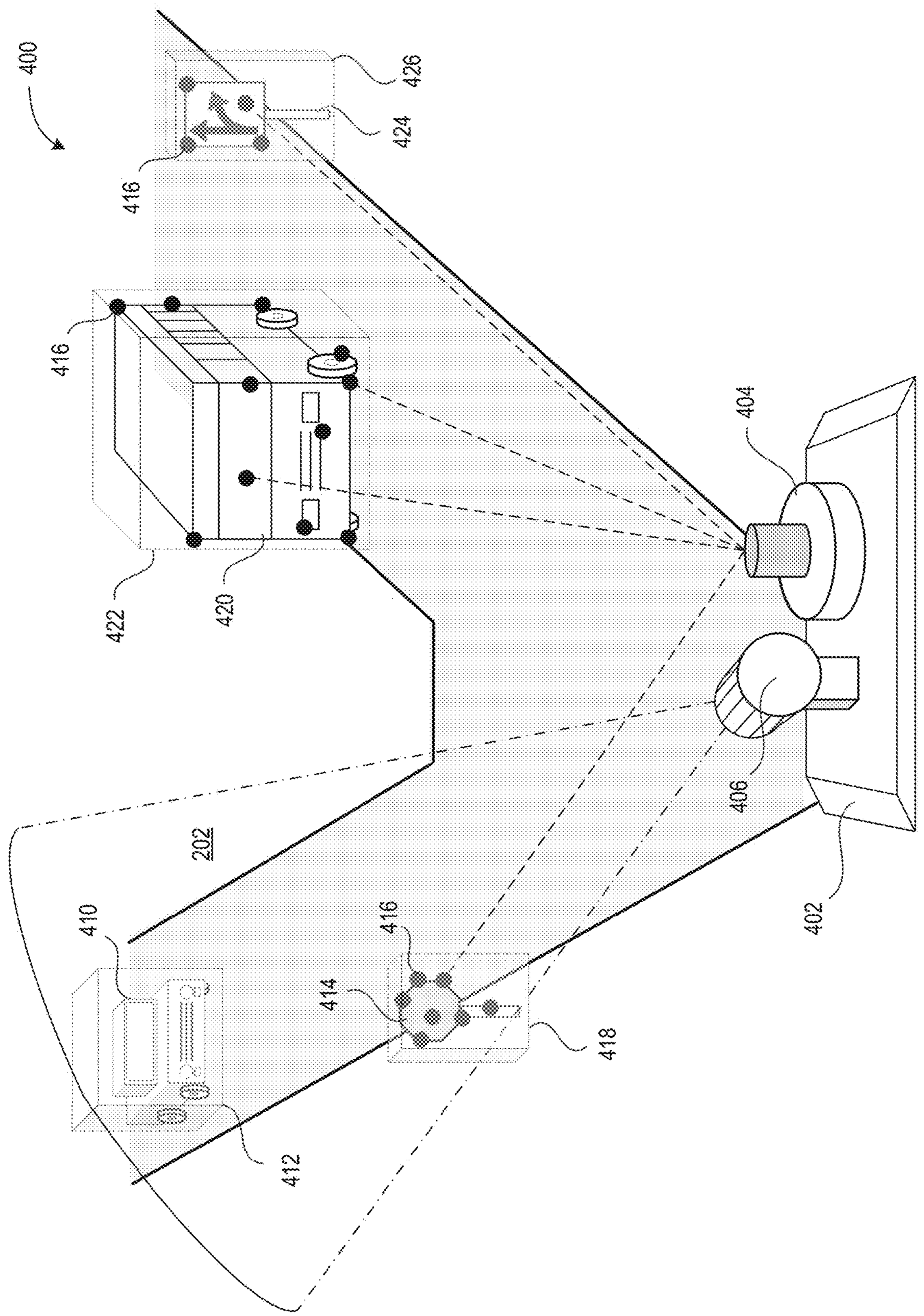
FIG. 4 depicts schematically a region of a driving environment that includes various objects whose images (e.g., camera and lidar images) can be cropped from larger images of the driving environment, in accordance with some implementations of the present disclosure.

FIG. 4 depicts schematically a region 400 of a driving environment that includes various objects whose images (e.g., camera and lidar images) can be cropped from larger images of the driving environment, in accordance with some implementations of the present disclosure. FIG. 4 depicts a portion of the AV 402 that supports a lidar sensor 404 (e.g., lidar 112) and a camera 406 (e.g., one of cameras 118). As illustrated schematically (and not to scale), objects located at large distances from the AV can be detected and tracked using camera images collected by camera 406 (or by additional cameras not shown in FIG. 4). For example, a light truck 410 located within camera range 202 can be captured by one or more camera images and further cropped from the camera image(s) using image cropping module 330 of FIG. 3. Image cropping module 330 can deploy a lifting transform that projects one or more two-dimensional (2D) camera images onto a three-dimensional (3D) representation of the driving environment. For example, the lifting transform can determine lateral positioning of light truck 410 within the 2D imaging plane, can estimate a depth of light truck 410, and then use the lateral positioning and the estimated depth to determine dimensions and location of bounding box 412 around light truck 410. In some implementations, determination of the depths of objects can be improved by using stereo imaging techniques, e.g., where multiple images of the same object are obtained by multiple camera(s) 118 from various vantage points. In some implementations, determination of depths of objects can be further assisted by radar data, e.g., using a combination of camera images and the radar data.

Objects located at shorter ranges—e.g., as shown, a stop sign 414, a bus 420, and a lane direction sign 424—can be captured by a lidar point cloud (as well as camera images) in the form of return points 416 (indicated schematically with black circles). Lidar return points are usually directly associated with distances to the lidar receiver. Correspondingly, as lidars perform measurements directly in the 3D space, no lifting transform is usually needed to generate various bounding boxes, e.g., bounding box 418 for stop sign 414, bounding box 422 for bus 420, bounding box 426 for the lane direction sign 424, and so on.

Referring again to FIG. 3, the object identification MLMs of the cropping module 330 can identify types of the objects, e.g., based on the size of the bounding boxes and/or visual appearance of the objects. The types of the objects (e.g., a car, a truck, a bus, a pedestrian, a road sign, tree, or some other stationary object) can be used together with camera data and lidar data as inputs into OTP 132.

As illustrated in FIG. 3, OTP 132 can include one or more trained MLMs, e.g., some or all of the camera model 220, camera-lidar model 230, and lidar model 240. As described in more detail below in conjunction with FIGS. 5-8, camera data (e.g., cropped camera images) can be used as inputs into the camera model 220 and the camera-lidar model 230 whereas lidar data (e.g., cropped lidar images) can be used as inputs into the camera-lidar model 230 and the lidar model 240. Each of the models can be trained to detect and track objects that are located within a particular range of distances from the vehicle. The models 220-240 can be or include decision-tree algorithms, support vector machines, deep neural networks, and the like. Deep neural networks can include convolutional neural networks, recurrent neural networks (RNN) with one or more hidden layers, fully connected neural networks, long short-term memory neural networks, transformers, Boltzmann machines, and so on. As the distance to an object changes (e.g., decreases), object tracks are passed over from one model to the next model, as indicated by the open arrows in FIG. 3.

Models 220-240 can be trained using actual camera images and lidar images depicting objects present in various driving environments, e.g., urban driving environments, highway driving environments, rural driving environments, off-road driving environments, and/or the like. Training images can be annotated with ground truth, which can include correct size, type, positioning, bounding boxes, velocities, etc., of objects at a plurality of times associated with motion of these objects from large distances (far inside within the camera range) to small distances (deep within the lidar range). In some implementations, annotations may be made using human inputs. Training can be performed by a training engine 342 hosted by a training server 340, which can be an outside server that deploys one or more processing devices, e.g., central processing units (CPUs), graphics processing units (GPUs), and/or the like. In some implementations, some or all of the models 220-240 can be trained by training engine 342 and subsequently downloaded onto the perception system of the AV. Models 220-240, as illustrated in FIG. 3, can be trained using training data that includes training inputs 344 and corresponding target outputs 346 (correct matches for the respective training inputs). During training of models 220-240, training engine 342 can find patterns in the training data that maps each training input 344 to the target output 346.

Training engine 342 can have access to a data repository 350 storing multiple camera images 352 and lidar images 354 for actual driving situations in a variety of environments. Training data stored in data repository 350 can include large datasets (e.g., with thousands or tens of thousands of images or more) that include cropped camera image patches and cropped lidar image patches. The training data can further include ground truth information for the camera/lidar images, e.g., locations of objects' bounding boxes relative to the corresponding driving environments, velocities, acceleration, angular velocities, and/or other data characterizing positioning, orientation, and motion of the objects in the training images. In some implementations, ground truth annotations can be made by a developer before the annotated training data is placed into data repository 350. During training, training server 340 can retrieve annotated training data from data repository 350, including one or more training inputs 344 and one or more target outputs 346. Training data can also include mapping data 348 that maps training inputs 344 to the target outputs 346.

During training of models 220-240, training engine 342 can change parameters (e.g., weights and biases) of various models 220-240 until the models successfully learn how to perform correct identification and tracking of objects (target outputs 346). In some implementations, models 220-240 can be trained separately. In some implementations, models 220-240 can be trained together (e.g., concurrently). Different models can have different architectures (e.g., different numbers of neuron layers and different topologies of neural connections) and can have different settings (e.g., activation functions, etc.) and can be trained using different hyperparameters.

The data repository 350 can be a persistent storage capable of storing lidar data, camera images, as well as data structures configured to facilitate accurate and fast identification and validation of sign detections, in accordance with various implementations of the present disclosure. Data repository 350 be hosted by one or more storage devices, such as main memory, magnetic or optical storage disks, tapes, or hard drives, network-attached storage (NAS), storage area network (SAN), and so forth. Although depicted as separate from training server 340, in an implementation, the data repository 350 can be a part of training server 340. In some implementations, data repository 350 can be a network-attached file server, while in other implementations, data repository 350 can be some other type of persistent storage such as an object-oriented database, a relational database, and so forth, that can be hosted by a server machine or one or more different machines accessible to the training server 340 via a network (not shown in FIG. 3).

Figure 5:
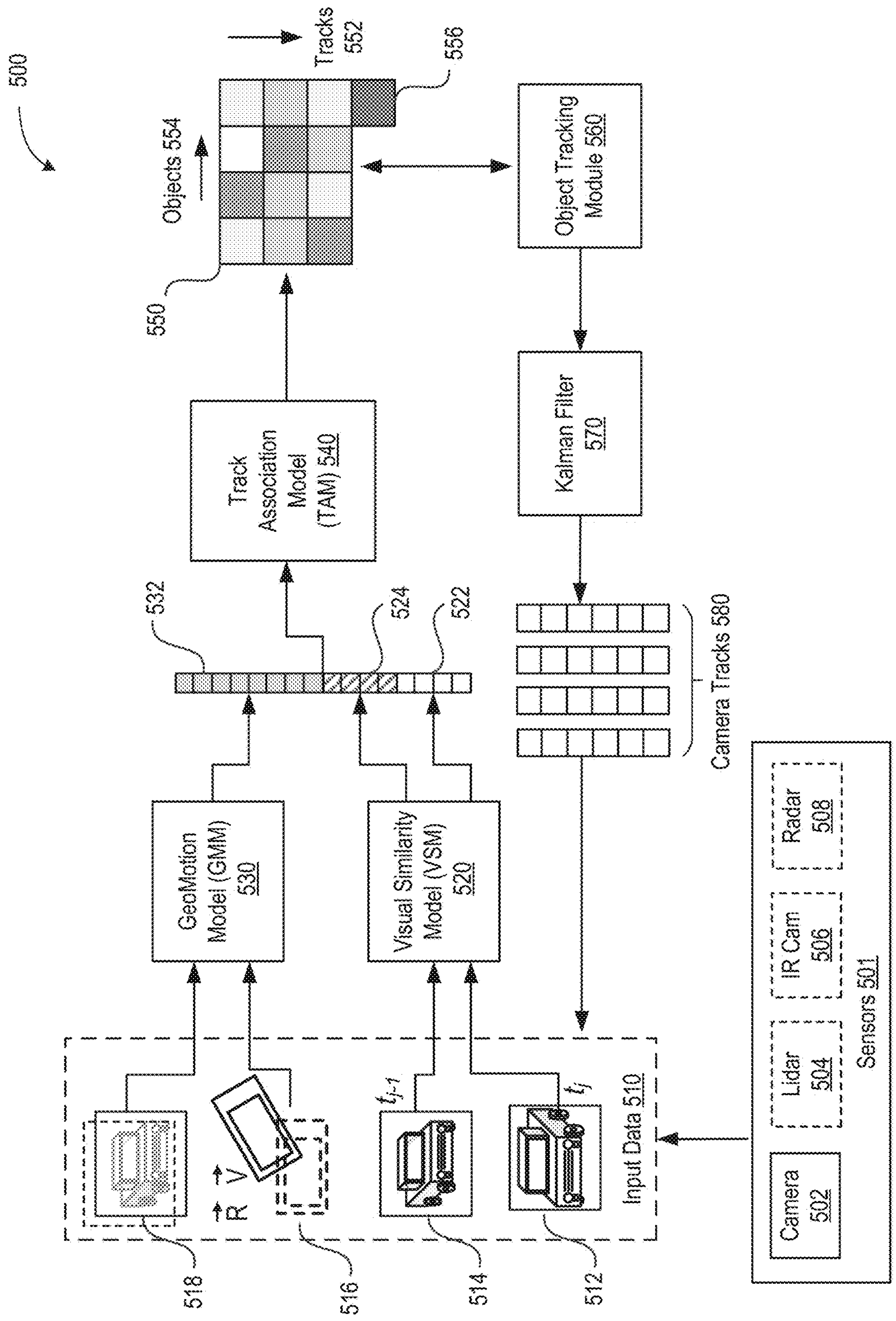
FIG. 5 is a schematic diagram illustrating example operations of a camera model that can be deployed as part of pipelined detection and tracking of objects in driving environments, in accordance with some implementations of the present disclosure.

FIG. 5 is a schematic diagram illustrating example operations 500 of a camera model that can be deployed as part of pipelined detection and tracking of objects in driving environments, in accordance with some implementations of the present disclosure. Operations 500 can be performed by camera model 220, in some implementations. Operations 500 can be performed to first establish and then update a set of object tracks, e.g., camera tracks 580, using input data 510 obtained by sensors 501. An "object track," or simply "track," should be understood as a set of data associated with a particular object in the driving environment and characterizing location, orientation, and/or motion of the object relative to the environment and/or the vehicle hosting sensing and perception equipment. Track(s) can include sensor data (which can be processed or unprocessed), such as patches of camera images, patches of lidar images (during subsequent stages of pipeline tracking) associated with one or more measurement timestamps. Track(s) can include any number of properties of objects inferred from sensor data. For example, track(s) can also include 2D or 3D bounding boxes determined using the patches of images of the objects. Track(s) can further include any motion characteristics of the objects, including but not limited to coordinates, velocity (both speed and direction of motion), acceleration (that includes negative acceleration indicating deceleration), angular velocity (e.g., in the instances of an object making a turn), angular acceleration, and/or other motion characteristics. Track(s) can include a type/class of the object identified from the object's visual characteristics and/or motion of the object.

Operations 500 update data stored as camera track(s) 580, $\text{Track}_j=F(\text{Track}_{j-1}, \text{Data}_j)$, where $\text{Track}_{j-1}$ denotes track data stored at timestamp $t_{j-1}$ (which can include data stored before $t_{j-1}$, e.g., during previous updates), $\text{Data}_j$ is new data that becomes available at timestamp $t_j$, and F( ) is a function that is implemented, among other resources, by various models and components of the camera model. When a new track is being first created (initiated), e.g., a new object enters a camera field of view, track data $\text{Track}_j$ can be null data.

Initial processing of input data 510 received (at timestamp $t_j$) from sensors 501 can be performed using a visual similarity model (VSM) 520 and a geo-motion model (GMM) 530. In some implementations, received input data 510 can include data received from one or more cameras 502. In some implementations, input data 510 can include data received from infrared (IR) camera 506 and/or one or more radar(s) 508. In one implementation, input data 510 can include N patches depicting the corresponding number of objects identified (e.g., by various models of image cropping module 330) as being present within the camera range. The number of patches/objects N can be the same as the number of existing tracks, e.g., in the instances where no new objects have entered the camera range and no previously detected objects have departed from the camera range. In some instances, the number of patches/objects N can be different from the number of existing tracks M, e.g., in the instances where one or more new objects have entered the camera range or one or more previously detected objects have departed from the camera range. Input data 510 can include a patch 512 of one of N objects associated with the current timestamp $t_j$. Input data 510 can further include a patch 514 associated with one of the M existing tracks, e.g., patch 514 can be the most recent patch (from the previous timestamp $t_{j-1}$) of the corresponding camera track. Input data 510 can further include geo-motion data 516 (also referred to as positional data herein), e.g., some or all of the coordinates $\vec{R}$, velocity $\vec{V}$, acceleration $\vec{a}$, angular velocity $\vec{\omega}$, angular acceleration, and/or the like. In some implementations, the geo-motion data 516 can include a type of the object associated with the corresponding camera track.

Patches 512 and 514 can be processed by VSM 520 to generate respective feature vectors 522 and 524. In some implementations, VSM 520 can be or include a neural network of artificial neurons. The neurons can be associated with learnable weights and biases. The neurons can be arranged in layers. Some of the layers can be hidden layers. VSM 520 can include multiple hidden neuron layers. In some implementations, VSM 520 can include a number of convolutional layers with any suitable parameters, including kernel/mask size, kernel/mask weights, sliding step size, and the like. Convolutional layers can alternate with padding layers and can be followed with one or more pooling layers, e.g., maximum pooling layers, average pooling layers, and the like. Some of the layers of VSM 520 can be fully-connected layers. In some implementations, VSM 520 can be a network of fully-connected layers.

Feature vector 522 can be a digital representation of a visual appearance of an object depicted in patch 512 informed by patch 514. Similarly, feature vector 524 can be a digital representation of a visual appearance of an object depicted in patch 514 and informed by patch 512 (with both patches processed together). In some implementations, VSM 520 can be a network that generates independent feature vectors for patch 512 and patch 514, each feature vector encoding visual appearance of the corresponding patch without a context of the other patch (e.g., using two separate instances of application of VSM 520).

GMM 530 can obtain a feature vector 532 that encodes geo-motion data 516. In some implementations, GMM 530 also processes additional information 518 that is derived from the object tracks. Additional information 518 can include coordinates and sizes of one or more 2D or 3D bounding boxes associated with the corresponding track, e.g., the bounding box associated with a previous timestamp or k previous timestamps (k>1) stored as part of the track. Additional information 518 can further include an intersection over union (IOU) value for an overlap between the bounding box for objected depicted in patch 512 and patch 514 (or k such IOU values). In some implementations, GMM 530 can be a fully-connected network.

Feature vectors 522, 524, and 532 can be aggregated (e.g., concatenated) and processed by a track association model (TAM) 540 that outputs a probability $P_{il}$ that a track i, e.g., a track whose data is input via patch 514 and geo-motion data 516 (and, optionally, as part of additional information 518), is associated with the object l depicted in patch 512 (and, optionally, as part of additional information 518). TAM 540 can include one or more fully-connected layers and a suitable classifier, e.g., a sigmoid classifier that outputs probability $P_{il}$ within interval of values probability [0,1]. Operations described above can be performed for each track i=1, 2, . . . , M and for each object l=1, 2, . . . , N present in camera images acquired at timestamp $t_j$, for M×N total object-track pairs. In some implementations, any or some of M×N object-track pairs can be processed in parallel.

Processing of the object-track pairs generates an M×N matrix of probabilities $P_{il}$ 550 with different rows corresponding to different tracks i=1, 2, . . . , M 552 and different columns corresponding to different objects l=1, 2, . . . , N 554. Darkness of shading of different squares of matrix of probabilities 550 illustrates the probability of the respective object-track pairs, e.g., a first object is most likely associated with the third track, a second object is most likely associated with a first track, and a third object is most likely associated with a second track.

In those instances, where no new objects have appeared in the camera field of view and no existing objects have disappeared from the field of view, the matrix of probabilities is quadratic, M=N. In such instances, an object tracking module 560 may select object-track associations based on values $P_{il}$ using a suitable decision metric. For example, a subset of M matrix elements $\{\tilde{P}_{il}\}$ of the matrix of probabilities such that 1) each row i and each column j of the full probability matrix is represented once in the subset, and 2) an average of all elements in the subset (e.g., an arithmetic mean, $$\frac{1}{N}\sum \tilde{P}_{il},$$

a geometric mean, or some other metric) has a maximum possible value.

In other instances, M≠N, e.g., as illustrated in FIG. 5, where there are M=3 tracks and N=4 objects are detected in the new (timestamp $t_j$) images. Such a situation can occur if one or more new objects have entered (or departed from) the field of view. In particular, if an object is characterized with a probability of association with any of the existing tracks 552 that is less than a certain (e.g., empirically determined or learned during training) value $P_{open}$ (e.g., $P_{open}$=70%, 60%, or some other number), a new track is opened and associated with the object. For example, as illustrated in FIG. 5, a fourth track is opened for a fourth object 556 that has a low probability of association with the first three tracks. Any number of new tracks can be opened at any particular timestamp.

In those instances, where the number of objects is less than the number of tracks, N<M, one or more tracks 552 can be suspended. A suspended track can be any track left without an assigned object after the most recent timestamp processing. A suspended track is not updated with no new information but, in some implementations, is buffered for a certain set number of timestamps, e.g., S. A suspended track can be processed together with active tracks, as disclosed above. If, during later timestamp processing, e.g., $t_{j+1}$, $t_{j+2}$, . . . $t_{j+S}$, the probability that a suspended track is associated with any of the tracked objects is less than a certain (empirically determined or learned during training) value $P_{close}$ (e.g., $P_{close}$=60%, 50%, or some other number), the corresponding track is closed (deleted). If, on the other hand, a suspended track is re-associated with one of the tracked object during S time stamps after suspension, the track becomes active and is updated with new images and new inferred geo-motion data in a normal fashion. At any given timestamp, any number of tracks can be suspended and/or returned to the active track category (while any number of new tracks can be opened).

Having determined object-track pairings for various active tracks, object tracking module 560 can update the active tracks with new information. For example, patch 512 from the most recent timestamp $t_j$ can replace previous patch 514 from preceding timestamp $t_{j-1}$. Geo-motion data 516 (as well as additional information 518) can be recomputed based on the localization information at timestamp $t_j$. In some implementations, information in the camera tracks 580 can be updated using a suitable statistical filter, e.g., Kalman filter. Kalman filter computes a most probable geo-motion data (e.g., coordinates $\vec{R}$, velocity $\vec{V}$, acceleration $\vec{a}$, angular velocity $\vec{\omega}$, etc.) in view of the measurements (images) obtained, predictions made according to a physical model of object's motion, and some statistical assumptions about measurement errors (e.g., covariance matrix of errors).

Processing of images acquired at subsequent timestamps $t_{j+1}$, $t_{j+2}$, etc., can be performed substantially as disclosed above, using new input data 510 to update camera tracks 580 using repeated processing of the new input data by models 520-540.

Figure 6:
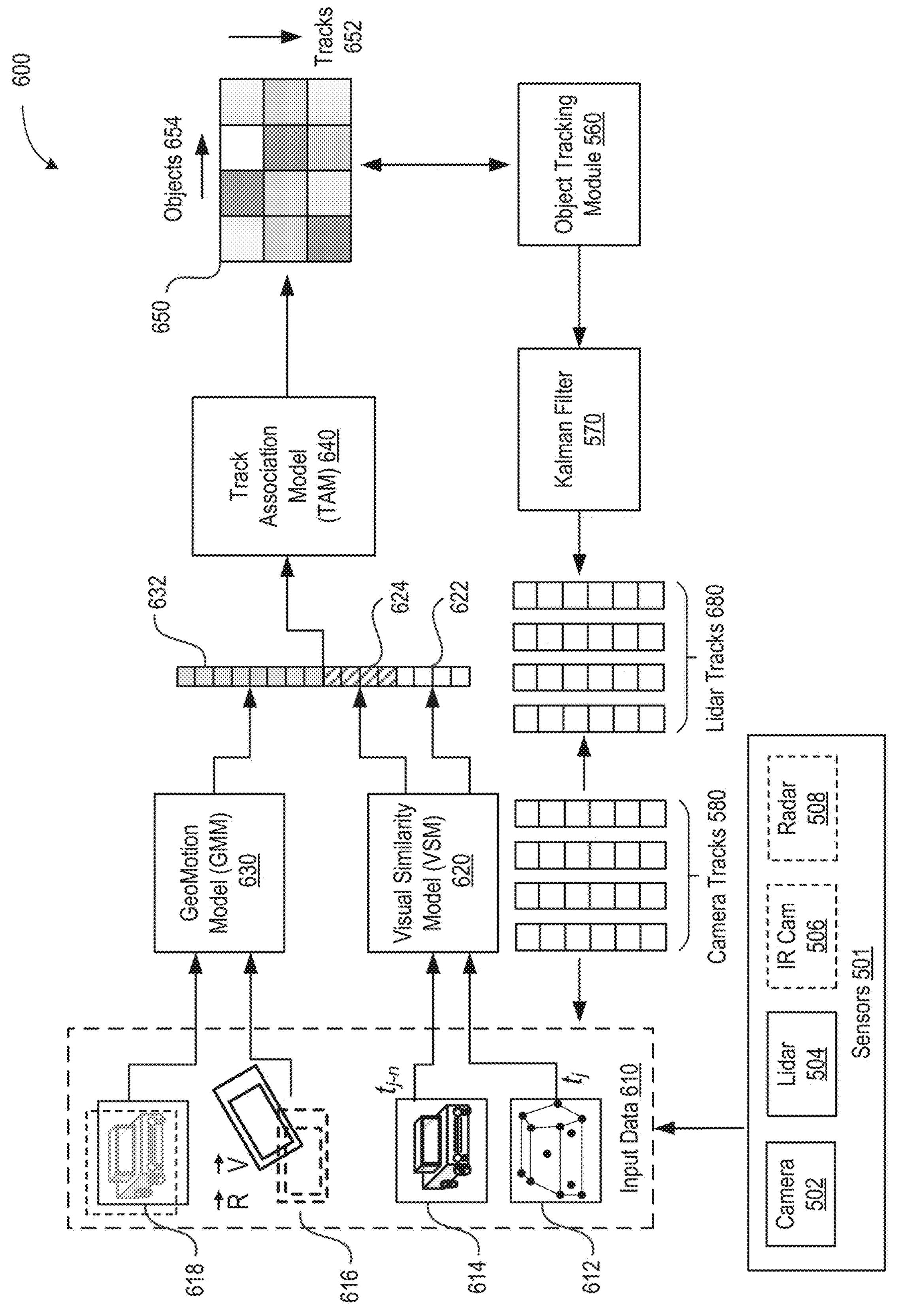
FIG. 6 is a schematic diagram illustrating example operations of a camera-lidar model that can be deployed as part of pipelined detection and tracking of objects in driving environments, in accordance with some implementations of the present disclosure.

FIG. 6 is a schematic diagram illustrating example operations 600 of a camera-lidar model that can be deployed as part of pipelined detection and tracking of objects in driving environments, in accordance with some implementations of the present disclosure. Operations 600 can be performed by camera-lidar model 230, in some implementations. In some implementations, operations 600 can commence once the sensing system of the vehicle begins to output lidar data. Operations 600 can then replace operations 500 of FIG. 5. For example, the sensing system can begin outputting lidar data once the signal-to-noise ratio of lidar returns exceeds a certain threshold value. It should be understood that operations 600 can, in some instances, be performed concurrently with operations 500, e.g., with operations 600 performed to track objects located within the transfer range 210 (with reference to FIG. 2) whereas operations 500 can be performed to track objects located within the camera range 204.

Operations 600 can be performed on camera tracks 580 that were created and updated by camera model 220 and can include any data described in conjunction with FIG. 5. 580. Initial processing of input data 610 received from sensors 501 can be performed using a visual similarity model (VSM) 620 and a geo-motion model (GMM) 630. In some implementations, received input data 610 can include data received from one or more lidars 504. In one implementation, input data 610 can include a patch 612 obtained by cropping lidar images 322 (e.g., by image cropping module 330) and depicting one of the detected objects, e.g., lth object. Input data 610 can further include a patch 614 of from one of camera track 580, e.g., ith camera track. Patch 614 can be the latest patch of ith camera track 580. Input data 610 can further include geo-motion (positional) data 616, which can continuously evolve from geo-motion data 516 and can include any type of the data included in the geo-motion data 516.

Patches 612 and 614 can be processed by VSM 620 to generate respective feature vectors 622 and 624. In some implementations, VSM 620 can have a similar architecture to VSM 520 but can be trained using different data, e.g., cropped lidar images in conjunction with cropped camera images.

Feature vector 622 can be a digital representation of a visual appearance of a portion of a lidar point cloud in patch 612, which can be informed by (e.g., processed by VSM 620 together with) camera patch 614. Similarly, feature vector 624 can be a digital representation of a visual appearance of an object depicted in camera image patch 614, which can be informed by lidar image patch 612. In some implementations, VSM 620 can be a network that generates independent feature vectors for lidar image patch 612 and camera image patch 614, each feature vector encoding visual appearance of the corresponding patch independent of the context of the other patch. VSM 620 can share at least some of the neuron architecture for lidar image patch 612 and camera image patch 614 processing.

GMM 630 can obtain a feature vector 632 that encodes geo-motion data 616. Additional input 618 into GMM 630 can include bounding box information that is similar to additional information 518 input into GMM 530. GMM 630 can have a similar architecture to GMM 530. Feature vectors 622, 624, and 632 can be aggregated (e.g., concatenated) and processed by a track association model (TAM) 640 that outputs a matrix of probabilities 650. TAM 640 can have a similar architecture to TAM 540.

Processing of tracks 652 and objects 654 of the matrix of probabilities 650 can be performed similarly to the processing of matrix of probabilities 550 disclosed in conjunction with FIG. 5. More specifically, object tracking module 560 generates lidar 680, e.g., by updating camera tracks 580 using new lidar data. The geo-motion data in various tracks 680 can be determined using Kalman filter 570. Opening and closing of tracks (not shown explicitly in FIG. 6) can also be performed as described in conjunction with FIG. 5 or using similar techniques.

In some instances, the camera-lidar model can be applied once (per object that moves into the lidar range), to the lidar data acquired at a particular timestamp $t_j$, e.g., if association of objects depicted in lidar images 612 with camera tracks is immediately successful. An association can be successful, e.g., when a probability of association of a given lidar image 612 with one of the existing camera tracks 580 is at or above a certain (empirically set or learned) probability, e.g., 80%, 90%, 95%, and/or the like. In some instances, the camera-lidar model can be applied several times, e.g., until the lidar data acquired at a series of timestamps $t_j$, $t_{j+1}$, $t_{j+2}$ . . . , e.g., if association of objects depicted in lidar images 612 with camera tracks is successful. In such instances, the camera model can continue updating camera tracks 580 (e.g., as described in conjunction with FIG. 5) so that updated camera image patches 614 and geo-motion data 616 is available for each of the series of timestamps $t_j$, $t_{j+1}$, $t_{j+2}$. In some implementations, once a lidar track 680 is successfully created for a given object, the corresponding camera track 580 for the object can be closed (or buffered, for at least a number of timestamps).

Figure 7:
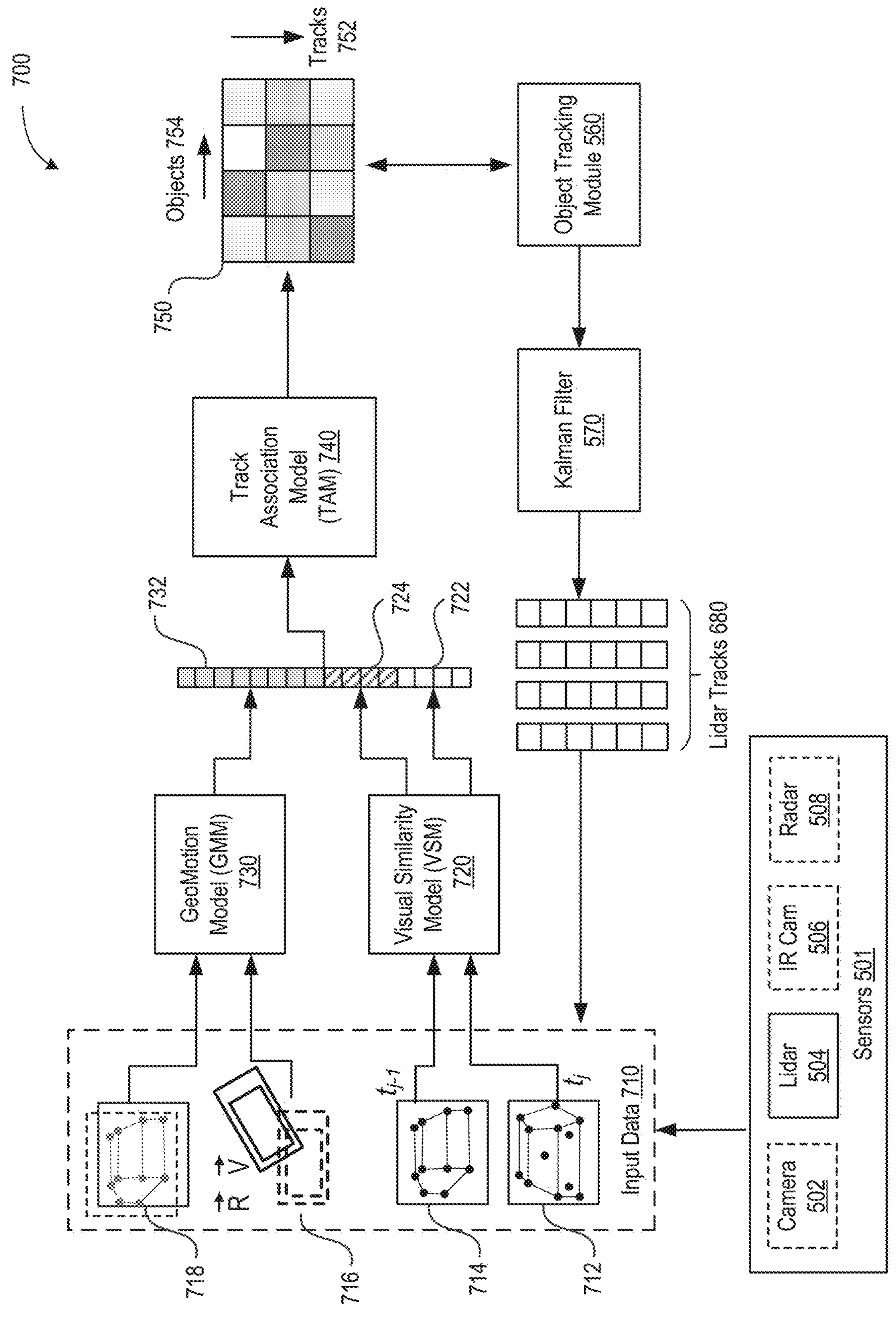
FIG. 7 is a schematic diagram illustrating example operations of a lidar model that can be deployed as part of pipelined detection and tracking of objects in driving environments, in accordance with some implementations of the present disclosure.

FIG. 7 is a schematic diagram illustrating example operations 700 of a lidar model that can be deployed as part of pipelined detection and tracking of objects in driving environments, in accordance with some implementations of the present disclosure. Operations 700 can be performed by lidar model 240, in some implementations. In some implementations, operations 700 can commence once the lidar tracks 680 are successfully associated with an object (and the corresponding camera track for the object closed and/ors buffered). It should be understood that, in some instances, operations 700 can be performed concurrently with operations 500 and/or operations 600, e.g., with operations 700 performed to track objects that are located in the lidar range 210, with objects located at larger distances tracked using operations 500 and/or operations 600.

Operations 700 can be performed on lidar tracks 680 that are initially inherited from camera tracks 580 created using camera model 220 and updated using camera-lidar model 230. Lidar tracks 680 can include any data that is part of camera tracks 580. Initial processing of input data 710 received from sensors 501 can be performed using a visual similarity model (VSM) 720 and a geo-motion model (GMM) 730. In some implementations, received input data 710 can include data received from one or more lidars 504.

In one implementation, input data 710 can include a patch 712 cropped from lidar images 322 (e.g., by image cropping module 330, with reference to FIG. 3) and depicting one of the detected objects, e.g., lth object. Input data 710 can further include a lidar image patch 714 of a lidar track, e.g., ith track. Patch 714 can be the most recent lidar image patch of ith camera track 580. Input data 710 can further include geo-motion (positional) data 716, which can continuously evolve from geo-motion data 616 and can include any type of the data included in geo-motion data 616.

Patches 712 and 714 can be processed by VSM 720 to generate respective feature vectors 722 and 724. In some implementations, VSM 720 can have a similar architecture to VSM 620 and/or VSM 520 but can be trained using cropped lidar images.

Feature vector 722 can be a digital representation of a visual appearance of a portion of a lidar point cloud in patch 712, which can be informed by patch 714 (e.g., processed together with patch 714 by VSM 720). Similarly, feature vector 724 can be a digital representation of a visual appearance of an object depicted in lidar image patch 714, which can be informed by lidar image patch 712. In some implementations, VSM 720 can be a network that generates independent feature vectors for patch 712 and patch 714, each feature vector encoding visual appearance of the corresponding patch independent of the context of the other patch.

GMM 730 can obtain a feature vector 732 that encodes geo-motion data 716. Additional input 718 into GMM 730 can include bounding box information, which can be similar to additional input 618 into GMM 630. GMM 730 can have a similar architecture to GMM 630 and/or GMM 530. Feature vectors 722, 724, and 732 can be aggregated (e.g., concatenated) and processed by a track association model (TAM) 740 that outputs a matrix of probabilities 760. TAM 740 can have a similar architecture to TAM 640 and/or TAM 540.

Processing of tracks 752 and objects 754 of the matrix of probabilities 750 can be performed similarly to processing of matrix of probabilities 550 disclosed in conjunction with FIG. 5 and/or matrix of probabilities 650 disclosed in conjunction with FIG. 6. More specifically, object tracking module 560 updates lidar tracks 680, which can be performed using Kalman filter 570. Opening and closing of tracks can also be performed as described in conjunction with FIG. 5 or using similar techniques (not shown explicitly in FIG. 7).

Although FIGS. 5-7 feature separate matrices of probabilities 550, 650, and 750 constructed by the respective models 220, 230, and 240, in some implementations, a combined (e.g., joint) matrix of probabilities that is processed by object tracking module 560 (and using Kalman filter 570).

Figure 8:
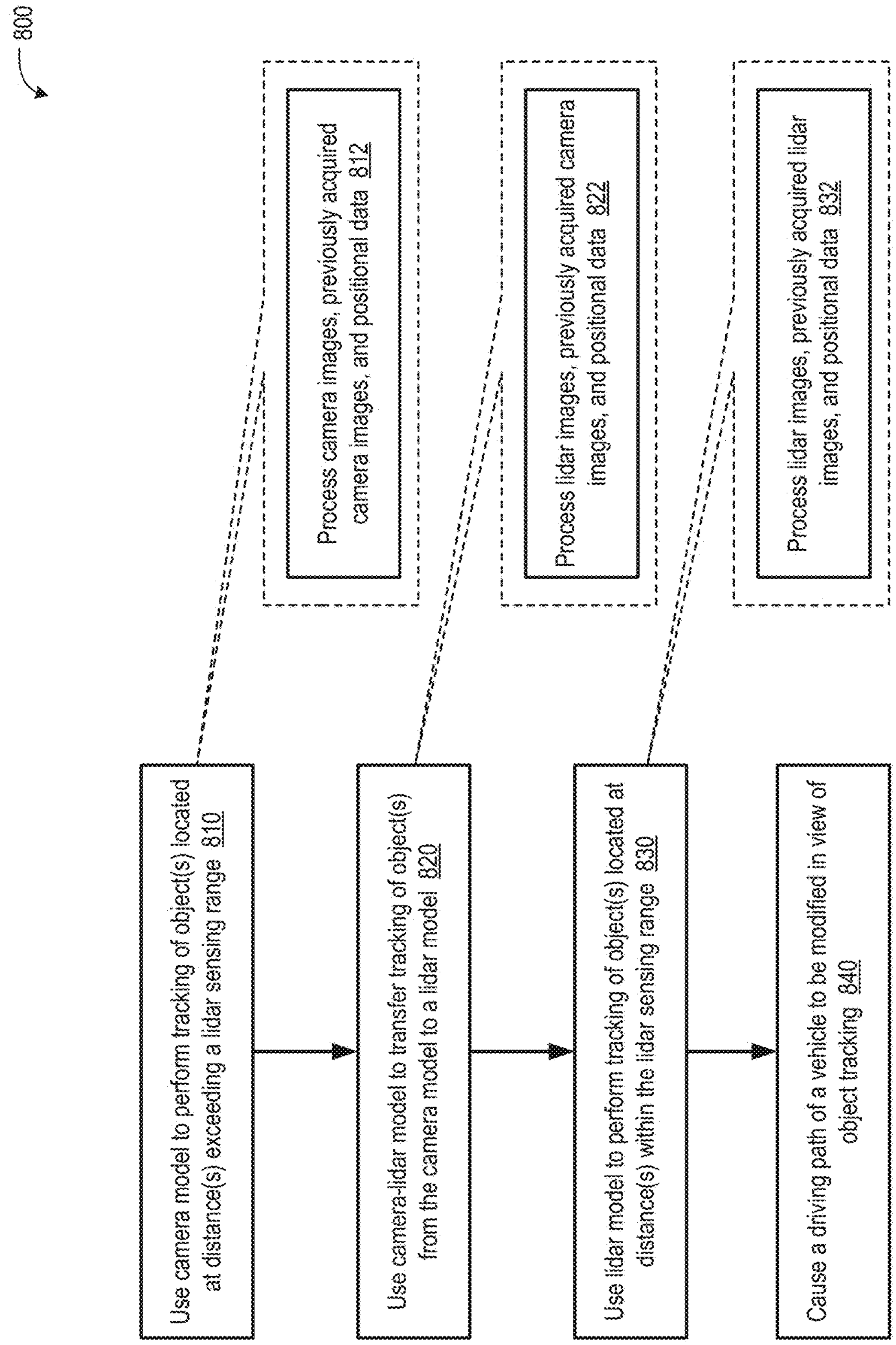
FIG. 8 illustrates an example method of tracking of objects in vehicle environments using pipelined processing by multiple machine learning models, in accordance with some implementations of the present disclosure.

FIG. 8 illustrates an example method 800 of tracking of objects in vehicle environments using pipelined processing by multiple machine learning models, in accordance with some implementations of the present disclosure. A processing device, having one or more processing units (CPUs), one or more graphics processing units (GPUs), and memory devices communicatively coupled to the CPU(s) and/or GPUs can perform method 800 and/or each of its individual functions, routines, subroutines, or operations. Method 800 can be directed to systems and components of a vehicle. In some implementations, the vehicle can be an autonomous vehicle (AV), such as AV 100 of FIG. 1. In some implementations, the vehicle can be a driver-operated vehicle equipped with driver assistance systems, e.g., Level 2 or Level 3 driver assistance systems, that provide limited assistance with specific vehicle systems (e.g., steering, braking, acceleration, etc. systems) or under limited driving conditions (e.g., highway driving). The processing device executing method 800 can perform instructions issued by various components of the perception system 130 of FIG. 1, e.g., OTP 132. Method 800 can be used to improve performance of the autonomous vehicle control system 140. In certain implementations, a single processing thread can perform method 800. Alternatively, two or more processing threads can perform method 800, each thread executing one or more individual functions, routines, subroutines, or operations of the methods. In an illustrative example, the processing threads implementing method 800 can be synchronized (e.g., using semaphores, critical sections, and/or other thread synchronization mechanisms). Alternatively, the processing threads implementing method 800 can be executed asynchronously with respect to each other. Various operations of method 800 can be performed in a different (e.g., reversed) order compared with the order shown in FIG. 8. Some operations of method 800 can be performed concurrently with other operations. Some operations can be optional.

At block 810, method 800 can include using a camera model (e.g., camera model 220) to perform object tracking of object(s) located at distances exceeding a lidar sensing range (e.g., lidar range 208). More specifically, a processing device performing method 800 can use an output of a first set of one or more NNs (e.g., camera model 220 of FIG. 2 and FIG. 3) to update a plurality of object tracks (e.g., camera tracks 580 in FIG. 5). Each of the plurality of object tracks can include positional data (e.g., geo-motion data 516) for a respective object of a plurality of objects. In some implementations, the positional data can include coordinates of the respective object, a bounding box associated with the respective object, a velocity of the respective object, and/or other data.

In some implementations, an input into the first set of NNs can include: one or more camera images (e.g., patches 512) of an outside environment acquired at a first time (e.g., time $t_j$), and the positional data from the plurality of object tracks. The one or more camera images can be single-object images (patches) cropped from a larger image of the outside environment. In some implementations, the input into the first set of NNs can include one or more previously acquired (e.g., at time $t_{j-1}$, $t_{j-2}$, etc.) camera images (e.g., patches 514) of the outside environment and associated with various object tracks.

In some implementations, operations of block 810 can include processing (e.g., as depicted schematically with block 812), using a first NN (e.g., VSM 520) of the first set of NNs, the one or more camera images acquired at the first time (e.g., patches 512) and the one or more previously acquired camera images (e.g., patches 514) to generate a plurality of visual feature vectors (e.g., feature vectors 522, 524). Operations of block 810 can also include processing, using a second NN (e.g., GMM 530) of the first set of NNs, at least the positional data from the plurality of object tracks to generate a plurality of positional feature vectors (e.g., feature vectors 532). Operations of block 810 can further include processing, using a third NN (e.g., TAM 540) of the first set of NNs, the plurality of visual feature vectors and the plurality of positional feature vectors.

The output of the first set of NNs can include a set of probabilities (e.g., matrix of probabilities 550) characterizing prospective associations of individual objects of the plurality of objects (e.g., objects 554) with individual object tracks (e.g., tracks 552) of the plurality of object tracks. The set of probabilities can be used to associate each object of the plurality of objects with a corresponding object track of the plurality of object tracks. Operations of block 810 can include using an output of the third NN to update the plurality of object tracks. In some implementations, such updating can be performed by object tracking module 560 (and using Kalman filter 570). For example, once a new patch 512 has been identified as belonging to an object associated with a particular object track, new coordinates of the object can be estimated based on information contained in patch 512 (e.g., the bounding box of the object).

In some implementations, the first set of NNs (the camera model) can be trained using a plurality of camera images of objects at distances exceeding a lidar sensor range and a ground truth positional data for such objects.

At block 820, method 800 can include using a camera-lidar model (e.g., camera-lidar model 230) to perform object tracking of object(s) located at distances within the lidar sensing range (e.g., near the upper boundary of the lidar range). The camera-lidar model can be trained to transfer, using the camera images and the lidar images, object tracking from the camera model to a lidar model. More specifically, the processing device performing method 800 can use an output of a second set of one or more NNs (e.g., camera-lidar model 230) to further update the plurality of object tracks (e.g., update camera tracks 580 to obtain lidar tracks 680, as illustrated in FIG. 6). In some implementations, the output of the camera-lidar model can be computed responsive to an occurrence of a threshold condition. The threshold condition can occur when a distance to the one or more objects becomes less than a threshold distance (e.g., an upper boundary of the lidar range, according to specifications of the lidar sensor or determined using field testing), or when the one or more lidar images of the outside environment become available (e.g., provided by the sensing system of the vehicle).

In some implementations, an input into the second set of NNs can include: one or more lidar images (e.g., lidar image patches 612) of the outside environment acquired at a second time (e.g., a time that is later than the first time), the one or more camera images of the outside environment acquired at the first time (e.g., one or more of patches 512 previously processed by camera model and associated with one of the object tracks), and the positional data from the plurality of object tracks (e.g., geo-motion data 616).

In some implementations, operations of block 820 can include processing (e.g., as depicted schematically with block 822), using a first NN (e.g., VSM 620) of the second set of NNs, the one or more lidar images (e.g., lidar image patches 612) acquired at the second time and the one or more camera images acquired at the first time (e.g., camera images 614) to generate a plurality of visual feature vectors (e.g., feature vectors 622, 624). Operations of block 820 can also include processing, using a second NN (e.g., GMM 630) of the second set of NNs, at least the positional data from the plurality of object tracks to generate a plurality of positional feature vectors (e.g., feature vectors 632). Operations of block 820 can further include processing, with a third NN (e.g., TAM 640) of the second set of NNs, the plurality of visual feature vectors and the plurality of positional feature vectors.

The output of the second set of NNs can include a set of probabilities (e.g., matrix of probabilities 650) characterizing prospective associations of individual objects of the plurality of objects with individual object tracks of the plurality of object tracks. The set of probabilities can be used to determine (and update) object-track associations, e.g., as disclosed above in conjunction with the matrix of probabilities 550.

The second set of NNs (e.g., camera-lidar model) can be trained using a plurality of lidar images, a second plurality of camera images of the objects at distances near a top boundary of the lidar sensor range, and a ground truth positional data for such objects.

At block 830, method 800 can include using a lidar model (e.g., lidar model 240) to perform object tracking of object(s) located at distances within the lidar sensing range. Object tracking by the lidar model can be performed once camera-lidar model have successfully linked the lidar data (e.g., lidar images 612) to the tracks established using camera data. More specifically, the processing device performing method 800 can use an output of a third set of one or more NNs (e.g., lidar model 240) to further update the plurality of object tracks (e.g., update lidar tracks 680, as illustrated in FIG. 7). In some implementations, an input into the third set of NNs can include one or more lidar images (e.g., lidar image patches 712) of the outside environment acquired at a third time (e.g., a time that is later than the second time, one or more previously acquired lidar images of the outside environment (e.g., one or more of lidar image patches 714 previously processed by the lidar model or the camera-lidar model), and associated with the plurality of object tracks, and the positional data from the plurality of updated object tracks (e.g., geo-motion data 716).

In some implementations, operations of block 830 can include processing (e.g., as depicted schematically with block 832), using a first NN (e.g., VSM 720) of the third set of NNs, the one or more lidar images (e.g., lidar image patches 712) acquired at the third time and the one or more previously-acquire lidar images (e.g., lidar image patches 714) to generate a plurality of visual feature vectors (e.g., feature vectors 722, 724). Operations of block 830 can also include processing, with a second NN (e.g., GMM 730) of the third set of NNs, at least the positional data from the plurality of object tracks to generate a plurality of positional feature vectors (e.g., feature vectors 732). Operations of block 820 can further include processing, with a third NN (e.g., TAM 740) of the second set of NNs, the plurality of visual feature vectors and the plurality of positional feature vectors. The output of the third set of NNs can be used to update the plurality of object tracks, e.g., as disclosed above in conjunction with blocks 810 and 820.

At block 840, method 800 can continue with the processing device causing a driving path of a vehicle to be modified in view of the plurality of object tracks. For example, object tracks can inform AVCS 140 about current and anticipated locations of various objects in the outside environment, so that AVCS 140 can make steering, braking, acceleration, and/or other driving decisions accordingly.

The third set of NNs (e.g., lidar model) can be trained using a plurality of lidar images of the objects located within the lidar sensor range and a ground truth positional data for such objects.

Figure 9:
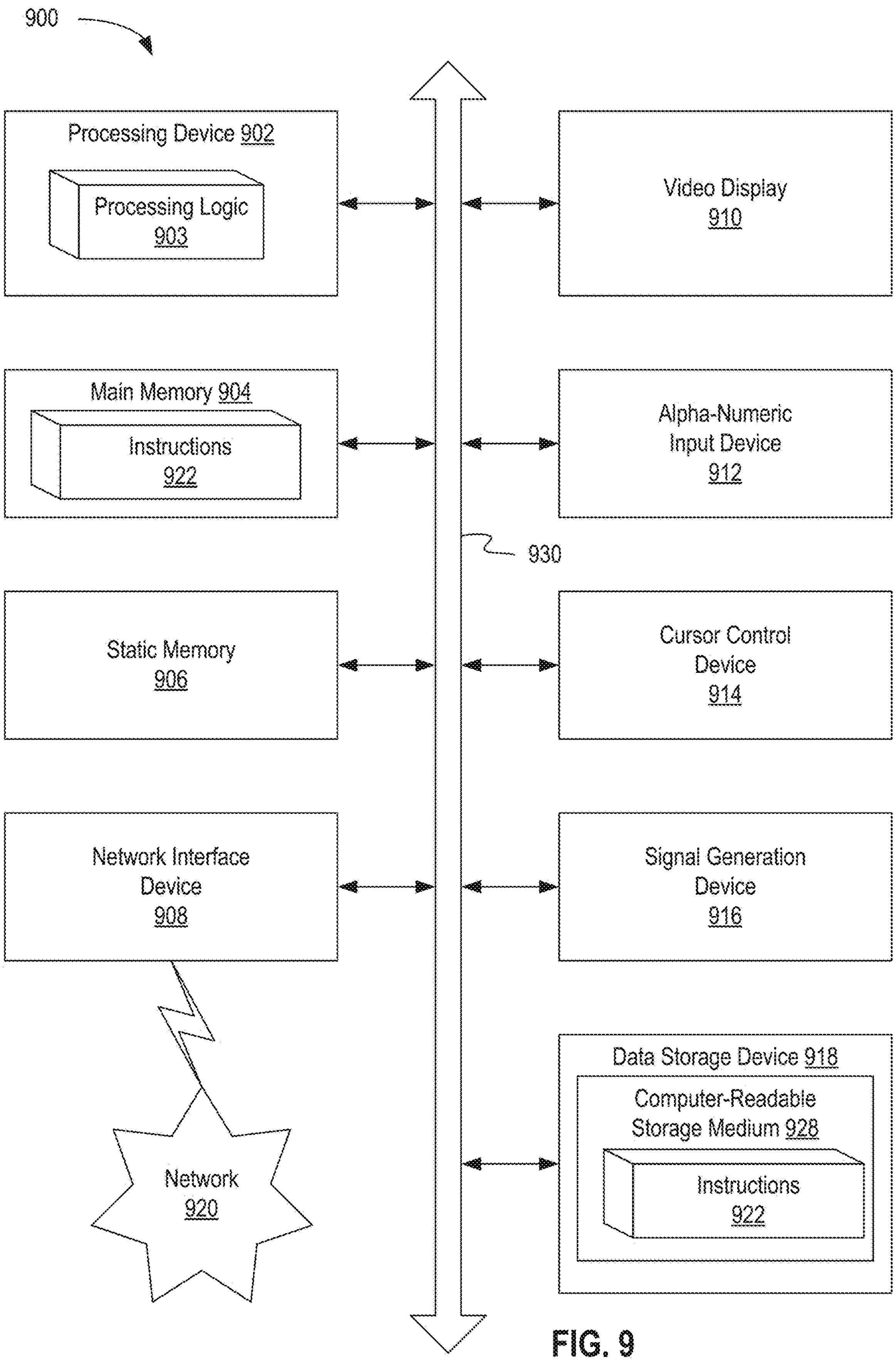
FIG. 9 depicts a block diagram of an example computer device capable of object tracking in vehicle environments using pipelined processing by multiple machine learning models, in accordance with some implementations of the present disclosure.

FIG. 9 depicts a block diagram of an example computer device 900 capable of object tracking in vehicle environments using pipelined processing by multiple machine learning models, in accordance with some implementations of the present disclosure. Example computer device 900 can be connected to other computer devices in a LAN, an intranet, an extranet, and/or the Internet. Computer device 900 can operate in the capacity of a server in a client-server network environment. Computer device 900 can be a personal computer (PC), a set-top box (STB), a server, a network router, switch or bridge, or any device capable of executing a set of instructions (sequential or otherwise) that specify actions to be taken by that device. Further, while only a single example computer device is illustrated, the term "computer" shall also be taken to include any collection of computers that individually or jointly execute a set (or multiple sets) of instructions to perform any one or more of the methods discussed herein.

Example computer device 900 can include a processing device 902 (also referred to as a processor or CPU), a main memory 904 (e.g., read-only memory (ROM), flash memory, dynamic random access memory (DRAM) such as synchronous DRAM (SDRAM), etc.), a static memory 906 (e.g., flash memory, static random access memory (SRAM), etc.), and a secondary memory (e.g., a data storage device 918), which can communicate with each other via a bus 930.

Processing device 902 (which can include processing logic 903) represents one or more general-purpose processing devices such as a microprocessor, central processing unit, or the like. More particularly, processing device 902 can be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 902 can also be one or more special-purpose processing devices such as an application specific integrated circuit (ASIC), a field programmable gate array (FPGA), a digital signal processor (DSP), network processor, or the like. In accordance with one or more aspects of the present disclosure, processing device 902 can be configured to execute instructions performing method 800 of tracking of objects in vehicle environments using pipelined processing by multiple machine learning models.

Example computer device 900 can further comprise a network interface device 908, which can be communicatively coupled to a network 920. Example computer device 900 can further comprise a video display 910 (e.g., a liquid crystal display (LCD), a touch screen, or a cathode ray tube (CRT)), an alphanumeric input device 912 (e.g., a keyboard), a cursor control device 914 (e.g., a mouse), and an acoustic signal generation device 916 (e.g., a speaker).

Data storage device 918 can include a computer-readable storage medium (or, more specifically, a non-transitory computer-readable storage medium) 928 on which is stored one or more sets of executable instructions 922. In accordance with one or more aspects of the present disclosure, executable instructions 922 can comprise executable instructions performing method 800 of tracking of objects in vehicle environments using pipelined processing by multiple machine learning models.

Executable instructions 922 can also reside, completely or at least partially, within main memory 904 and/or within processing device 902 during execution thereof by example computer device 900, main memory 904 and processing device 902 also constituting computer-readable storage media. Executable instructions 922 can further be transmitted or received over a network via network interface device 908.

While the computer-readable storage medium 928 is shown in FIG. 9 as a single medium, the term "computer-readable storage medium" should be taken to include a single medium or multiple media (e.g., a centralized or distributed database, and/or associated caches and servers) that store the one or more sets of operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus can be specially constructed for the required purposes, or it can be a general purpose computer system selectively programmed by a computer program stored in the computer system. Such a computer program can be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems can be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages can be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but can be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A system comprising:

a sensing system of a vehicle, the sensing system configured to acquire:

one or more camera images of an outside environment at a first time, and one or more lidar images of the outside environment at a second time, and a processing system of the vehicle, the processing system configured to:

provide the one or more camera images and positional data from a plurality of object tracks as input to a first set of one or more neural networks (NNs), each of the plurality of object tracks comprising positional data for a respective object of a plurality of objects in the outside environment;

update the plurality of object tracks based on an output of the first set of one or more NNs;

responsive to a distance from the vehicle to at least one object tracked by the plurality of object tracks being, at the second time, below a threshold distance. provide the one or more lidar images, the one or more camera images, and the positional data from the plurality of object tracks as input to a second set of one or more NNs;

further update the plurality of object tracks based on an output of the second set of one or more NNs; and cause a driving path of a vehicle to be modified in view of the plurality of object tracks.

2. The system of claim 1, wherein the positional data comprises one or more of:

coordinates of the respective object, a bounding box associated with the respective object, or a velocity of the respective object.

3. The system of claim 1, wherein the one or more camera images are single-object images cropped from a larger image of the outside environment.

4. The system of claim 1, wherein the input into the first set of NNs further comprises:

one or more previously acquired camera images of the outside environment and associated with the plurality of object tracks.

5. The system of claim 4, wherein to update the plurality of object tracks based on the output of the first set of one or more NNs, the processing system is to:

process, using a first NN of the first set of NNs, the one or more camera images acquired at the first time and the one or more previously acquired camera images to generate a plurality of visual feature vectors;

process, using a second NN of the first set of NNs, at least the positional data from the plurality of object tracks to generate a plurality of positional feature vectors;

process, using a third NN of the first set of NNs, the plurality of visual feature vectors and the plurality of positional feature vectors; and use an output of the third NN to update the plurality of object tracks.

6. The system of claim 1, wherein the processing system is further to:

use an output of a third set of one or more NNs to further update the plurality of object tracks, wherein an input into the third set of NNs comprises:

one or more lidar images of the outside environment acquired at a third time, one or more previously acquired lidar images of the outside environment and associated with the plurality of object tracks, and the positional data from the plurality of updated object tracks.

7. A method comprising:

providing, by a processing device, one or more camera images of an outside environment acquired at a first time, and positional data from a plurality of object tracks as input to a first set of one or more neural networks (NNs), each of the plurality of object tracks comprising positional data for a respective object of a plurality of objects in the outside environment of a vehicle;

updating, by the processing device, the plurality of object tracks based on an output of the first set of one or more NNs;

responsive to a distance from the vehicle to at least one object tracked by the plurality of object tracks being, at a second time, below a threshold distance, providing, by the processing device, one or more lidar images of the outside environment acquired at the second time, the one or more camera images of the outside environment acquired at the first time, and the positional data from the plurality of object tracks as input to a second set of one or more NNs;

further updating the plurality of object tracks based on an output of the second set of one or more NNs; and causing, by the processing device, a driving path of a vehicle to be modified in view of the plurality of object tracks.

8. The method of claim 7, wherein the positional data comprises one or more of:

coordinates of the respective object, a bounding box associated with the respective object, or a velocity of the respective object.

9. The method of claim 7, wherein the one or more camera images are single-object images cropped from a larger image of the outside environment.

10. The method of claim 7, wherein further updating the plurality of object tracks based on the output of the second set of one or more NNs is responsive to an occurrence of a threshold condition, and wherein the threshold condition comprises at least one of:

a distance to at least one of the plurality of objects becoming less than a threshold distance, or the one or more lidar images of the outside environment becoming available.

11. The method of claim 7, wherein the input into the first set of NNs further comprises:

one or more previously acquired camera images of the outside environment and associated with the plurality of object tracks.

12. The method of claim 11, wherein updating the plurality of object tracks based on an output of the first set of one or more NNs comprises:

processing, using a first NN of the first set of NNs, the one or more camera images acquired at the first time and the one or more previously acquired camera images to generate a plurality of visual feature vectors;

processing, using a second NN of the first set of NNs, at least the positional data from the plurality of object tracks to generate a plurality of positional feature vectors;

processing, using a third NN of the first set of NNs, the plurality of visual feature vectors and the plurality of positional feature vectors; and using an output of the third NN to update the plurality of object tracks.

13. The method of claim 7, wherein the output of the first set of NNs comprises:

a set of probabilities characterizing prospective associations of individual objects of the plurality of objects with individual object tracks of the plurality of object tracks.

14. The method of claim 13, further comprising:

associating, using the set of probabilities, each object of the plurality of objects with a corresponding object track of the plurality of object tracks.

15. The method of claim 7, wherein further updating the plurality of object tracks comprises:

processing, using a first NN of the second set of NNs, the one or more lidar images acquired at the second time and the one or more camera images acquired at the first time to generate a plurality of visual feature vectors;

processing, using a second NN of the second set of NNs, at least the positional data from the plurality of object tracks to generate a plurality of positional feature vectors;

processing, using a third NN of the second set of NNs, the plurality of visual feature vectors and the plurality of positional feature vectors; and using an output of the third NN to update the plurality of object tracks.

16. The method of claim 7, further comprising:

using an output of a third set of one or more NNs to further update the plurality of object tracks, wherein an input into the third set of NNs comprises:

one or more lidar images of the outside environment acquired at a third time, one or more previously acquired lidar images of the outside environment and associated with the plurality of object tracks, and the positional data from the plurality of updated object tracks.

17. The method of claim 16, wherein using the third set of NNs comprises:

processing, using a first NN of the third set of NNs, the one or more lidar images acquired at the third time and the one or more lidar images acquired at the second time to generate a plurality of visual feature vectors;

processing, using a second NN of the third set of NNs, at least the positional data from the plurality of object tracks to generate a plurality of positional feature vectors;

processing, using a third NN of the third set of NNs, the plurality of visual feature vectors and the plurality of positional feature vectors; and using an output of the third NN to update the plurality of object tracks.

18. The method of claim 7, wherein the first set of NNs is trained using a first plurality of camera images of objects at distances exceeding a lidar sensor range and a ground truth positional data for the objects, and wherein the second set of NNs is trained using a plurality of lidar images and a second plurality of camera images of the objects at distances within the lidar sensor range.

19. A non-transitory computer-readable storage medium, storing instructions thereon that, when executed by a processing device, cause the processing device to perform operations comprising:

providing one or more camera images of an outside environment acquired at a first time, and positional data from a plurality of object tracks as input to a first set of one or more neural networks (NNs), each of the plurality of object tracks comprising positional data for a respective object of a plurality of objects in the outside environment of a vehicle;

updating the plurality of object tracks based on an output of the first set of one or more NNs;

responsive to a distance from the vehicle to at least one object tracked by the plurality of object tracks being, at a second time, below a threshold distance, providing one or more lidar images of the outside environment acquired at the second time, the one or more camera images of the outside environment acquired at the first time, and the positional data from the plurality of object tracks as input to a second set of one or more NNs;

further updating the plurality of object tracks based on an output of the second set of one or more NNs; and causing, by the processing device, a driving path of a vehicle to be modified in view of the plurality of object tracks.

20. The non-transitory computer-readable storage medium of claim 19, wherein updating the plurality of object tracks based on the output of the first set of one or more NNs comprises:

processing, using a first NN of the first set of NNs, the one or more camera images acquired at the first time and one or more previously acquired camera images to generate a plurality of visual feature vectors;

processing, using a second NN of the first set of NNs, at least the positional data from the plurality of object tracks to generate a plurality of positional feature vectors;

processing, using a third NN of the first set of NNs, the plurality of visual feature vectors and the plurality of positional feature vectors; and using an output of the third NN to update the plurality of object tracks.

* * * * *